US007328307B2

(12) United States Patent
Hoogterp

(10) Patent No.: US 7,328,307 B2
(45) Date of Patent: Feb. 5, 2008

(54) METHOD AND APPARATUS FOR IMPROVING UPDATE PERFORMANCE OF NON-UNIFORM ACCESS TIME PERSISTENT STORAGE MEDIA

(75) Inventor: Dan Hoogterp, Monroe, CT (US)

(73) Assignee: TQuist, LLC, Monroe, CT (US)

( * ) Notice: Subject to any disclaimer, the term of this patent is extended or adjusted under 35 U.S.C. 154(b) by 206 days.

(21) Appl. No.: 11/038,579

(22) Filed: Jan. 21, 2005

(65) Prior Publication Data

US 2005/0210218 A1 Sep. 22, 2005

Related U.S. Application Data

(60) Provisional application No. 60/537,909, filed on Jan. 22, 2004.

(51) Int. Cl.
*G06F 12/00* (2006.01)
*G06F 13/00* (2006.01)
(52) U.S. Cl. .................. 711/114; 711/154; 711/203
(58) Field of Classification Search ............. 707/205; 710/56; 711/100, 114, 154, 159, 203
See application file for complete search history.

(56) References Cited

U.S. PATENT DOCUMENTS

| 6,038,619 | A | * | 3/2000 | Berning et al. ............. 710/33 |
| 6,070,225 | A | * | 5/2000 | Cheung et al. ............. 711/112 |
| 6,105,104 | A | * | 8/2000 | Guttmann et al. ............ 711/4 |
| 6,233,648 | B1 | * | 5/2001 | Tomita ...................... 711/4 |
| 6,651,147 | B2 | * | 11/2003 | Burns et al. ............. 711/154 |
| 2002/0073285 | A1 | * | 6/2002 | Butterworth ............. 711/154 |
| 2003/0221061 | A1 | * | 11/2003 | El-Batal et al. ........... 711/114 |

OTHER PUBLICATIONS

"File Space Allocation". AIX Version 4.3: General Programming Concepts: Writing and Debugging Programs, Chapter 5: File Systems and Directories. 2nd Edition. 1999.☐☐http://www.unet.univie.ac.at/aix/aixprggd/genprogc/toc.htm.*
Pechura, Michael. "Estimating File Access Time of Floppy Disks". Communications of the ACM, vol. 26, No. 10. Oct. 1983. pp. 754-763.*
"Extent-Based Allocation". Journaling File Systems for Linux. CMP Technology. May 2000. p. 3. http://www.byte.com/documents/s=365/byt20000524s0001/index3.htm.*

* cited by examiner

*Primary Examiner*—Tuan V. Thai
(74) *Attorney, Agent, or Firm*—Nixon & Vanderhye P.C.

(57) ABSTRACT

A high volume storage system is described which continuously remaps where data is stored. The remapping is designed so that writing occurs on an optimum speed basis tuned to the storage system being utilized, e.g., the writes occur in substantially sequential disk storage locations to the extent possible. By remapping data on a substantially continuous basis writes advantageously occur nearer the sequential performance limits of the particular drive or devices being utilized. A methodology is described which improves the external performance of a random access storage system, such as a RAID array. The illustrative embodiments introduce a continuous, optimized dynamic reorganization of the storage media that converts concurrent updates from one or more logical volumes to one or more sequential streams, as appropriate to the number of physical devices and channels over which the updates can be dispersed and thereby minimize the number of seek operations necessary on each physical device.

17 Claims, 9 Drawing Sheets

METHOD AND APPARATUS FOR IMPROVING UPDATE PERFORMANCE OF NON-UNIFORM ACCESS TIME PERSISTENT STORAGE MEDIA

CROSS-REFERENCES TO RELATED APPLICATIONS

This application claims the benefit of Provisional Application No. 60/537,909, filed Jan. 22, 2004, the entire content of which is hereby incorporated by reference in this application.

FIELD OF THE INVENTION

The invention generally relates to storage media. More particularly, the invention relates to methods and apparatus for dramatically improving the performance of high capacity storage systems.

BACKGROUND AND SUMMARY OF THE INVENTION

In many conventional high demand storage systems where high volume business transaction data is stored, the storage logical address space is mapped so that the actual data is stored on multiple physical drives. In certain updating operations, the storage system accesses one physical drive while in other updating operations the system accesses another physical drive. Such a multiple drive configuration provides a substantial performance enhancement over systems having only one physical drive.

In many of such storage systems, write transactions are distributed on a substantially random basis. In such conventional storage systems, it is difficult to predict the location of data updates due to the widely varied nature of business transactions. In such systems, there is a natural tendency towards randomly or widely distributed write transactions. Accordingly, write transactions that occur are typically distributed throughout the storage space.

In certain applications such write transactions may be clustered in small areas such that they can be written efficiently. However, in a significant performance-impacting percentage of cases, such write transactions are not written efficiently.

Conventional large volume storage systems commonly utilize a redundant array of independent disks (RAID). In such a RAID array, multiple drives are logically coupled to provide a larger composite storage entity that exhibits better storage capacity, performance and reliability than would be provided by a single drive or a group of unrelated drives.

In accordance with the exemplary, illustrative embodiments of the present invention described below, the inefficiencies in prior art storage systems are addressed in part by continuously remapping where data is stored. The remapping is designed so that writing occurs on an optimum speed basis tuned to the storage system being utilized, e.g., the writes occur in substantially sequential disk storage locations to the extent possible or in other patterns or distributions determined to minimize the time or resources necessary to accomplish the write activity. Thus, by analogy, in an exemplary embodiment, writing to disk occurs sequentially as if, for example, it were a tape.

Using the methodology described herein with respect to the illustrative embodiments, the optimum speed with which the disk device is capable of writing may be approached relative to conventional storage systems. By remapping data on a substantially continuous basis as described herein, writes advantageously occur nearer the sequential performance limits of the particular drive being utilized when compared with conventional high volume business storage systems. By continuously remapping data, the typical time consuming seeking operation that occurs during conventional write transaction processing is minimized. Further, in accordance with the disclosed exemplary embodiments, a methodology is described for persistently maintaining in a relatively long term storage, in a consistent state suitable for recovery or other purposes, the mapping information.

The illustrative methods and apparatus described herein dramatically improve the performance of non-uniform access-time persistent storage media. The illustrative embodiments provide significant benefits to the write (i.e., update, modify) bandwidth or throughput in persistent storage environments. The preferred embodiments improve the external performance of a random access storage system, such as a SAN, NAS or RAID array, when the actual data storage is contained on media with a non-uniform access-time, such as the difference in maximum performance on a conventional disk in sequential access versus random access or even substantially non-sequential access. The illustrative embodiments can be implemented at many locations between, inclusively, the application and the physical storage media's onboard device logic. The preferred embodiment would utilize processing and short-term memory resources of a storage subsystem, such as the main processing systems used in external disk subsystems like NAS, SAN or RAID boxes. Additional embodiments provide dramatic improvements to specific applications, such as databases, business transaction systems, content management systems, by employing variations of the methods at the application and/or operating system level.

The illustrative embodiments achieve dramatic gains by introducing a continuous, clustered or burst-mode, optimized dynamic reorganization of the storage media, or application container files, that converts concurrent updates to one or more sequential streams, as appropriate to the number of physical devices and channels over which the updates can be dispersed, and thereby minimize the number of seek operations, or relatively more time-consuming accesses on non-disk media with non-uniform access time, necessary on each physical device. The methods include provisions to maintain logical consistency of the information in a wide variety of failure or recovery scenarios.

The illustrative methodology also provides the ability to incrementally and efficiently reorganize the physical storage media to optimize contiguous read activity. The reorganization process can be accomplished without loss of normal operation performance by utilizing otherwise idle time in the affected storage media.

The illustrative methodology described herein may be used in conjunction with traditional read caching and write caching approaches, improving the overall performance of the subsystem beyond what can be achieved with caching alone.

DETAILED DESCRIPTION OF THE EXEMPLARY EMBODIMENTS

FIGS. 1-4 show various illustrative computer systems/storage architectures within which the exemplary embodiments of the present invention may reside. The methodology described herein may be applied at many diverse locations including but not limited to the control circuitry and logic for a computer disk drive or similar storage device with non-uniform access-time characteristics, management software for managing a set of drives in, for example, a single computer, a host operating system, a Device Driver, Host Bus Adapter, etc.

Figure 1:
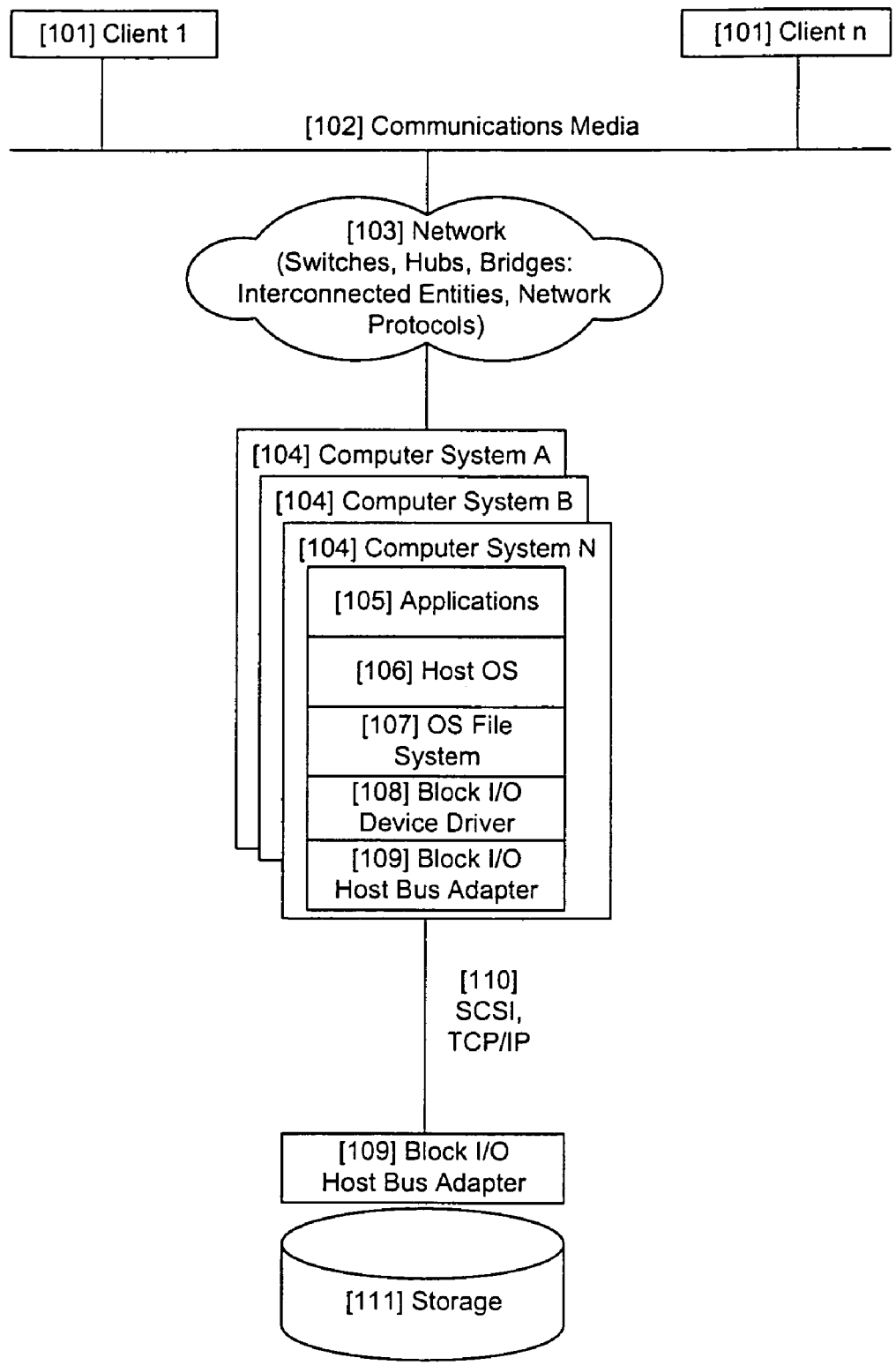
FIG. 1 is an exemplary block diagram depicting individual computers with attached disk arrays.

The method and apparatus of the exemplary embodiments may be applied in a wide array of different computer systems/storage architectures of which FIGS. 1-4 are illustrative. Before describing each storage system in detail, the FIG. 1-4 storage architectures will be first generally described. FIG. 1 shows individual computers 104A, B . . . N, which may be servers or desktop computers with directly attached disk arrays.

Figure 2:
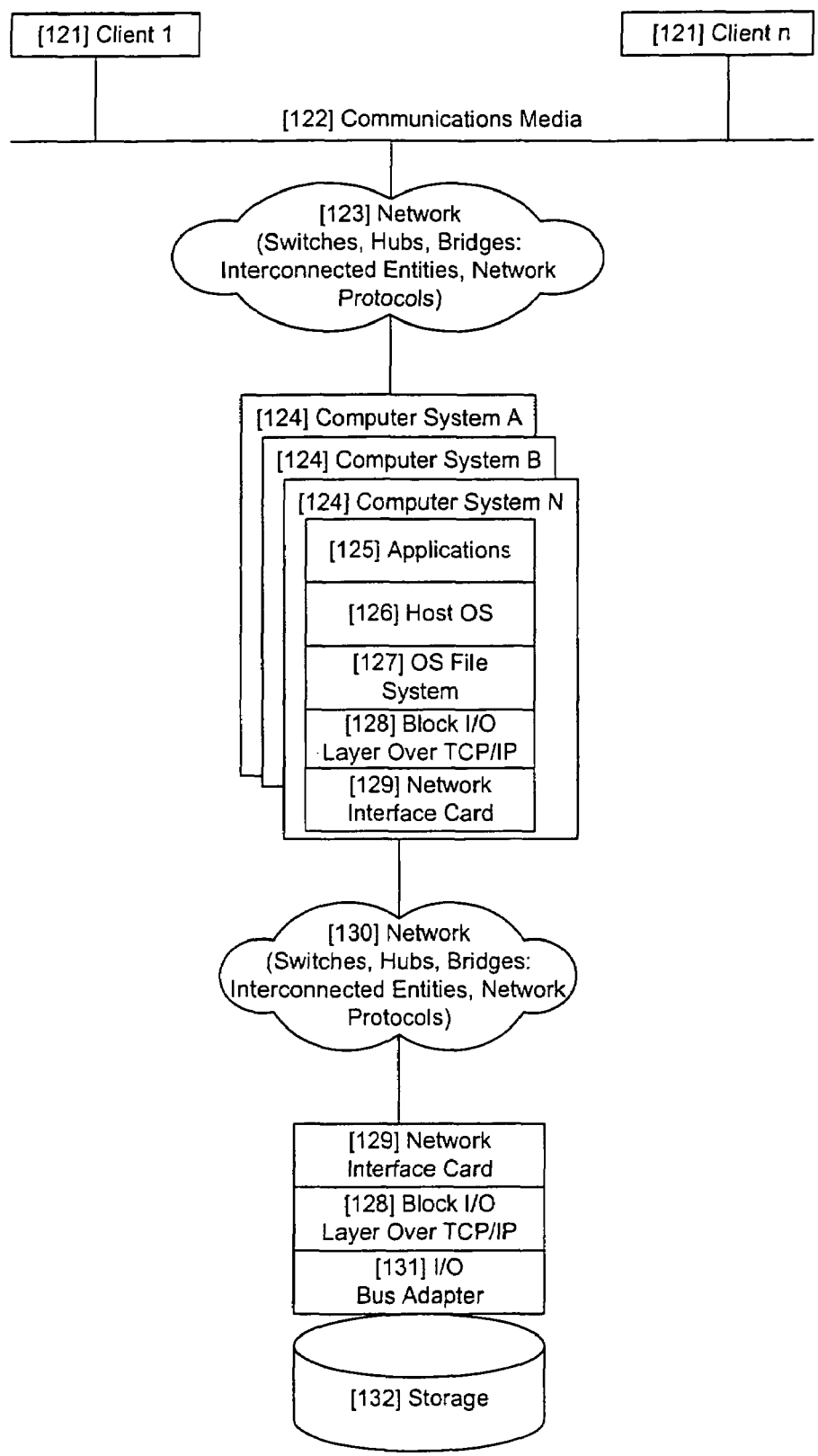
FIG. 2 is an exemplary block diagram showing an "iSCSI" storage architecture where computers may communicate with, for example, high-end storage systems over an IP network or other suitable network infrastructure.

FIG. 2 shows an "iSCSI" storage architecture which allows computers 124A . . . 124N to communicate with, for example, high-end storage systems over a network. It should recognized that the FIG. 2 computers 124 may still have direct storage attached thereto as in FIG. 1, but in addition, the configuration permits communicating with high-end storage via network 130.

The remapping methodology, in accordance with the present invention, may advantageously be utilized in conjunction with the illustrative "iSCSI" FIG. 2 configuration. The exemplary embodiments of the present invention alternatively may be, for example, implemented in the applications software 125, the host operating system 126 or as part of a device driver. Alternatively, the exemplary embodiments could be implemented in a card that manages storage 132 or in the storage 132 itself.

Figure 3:
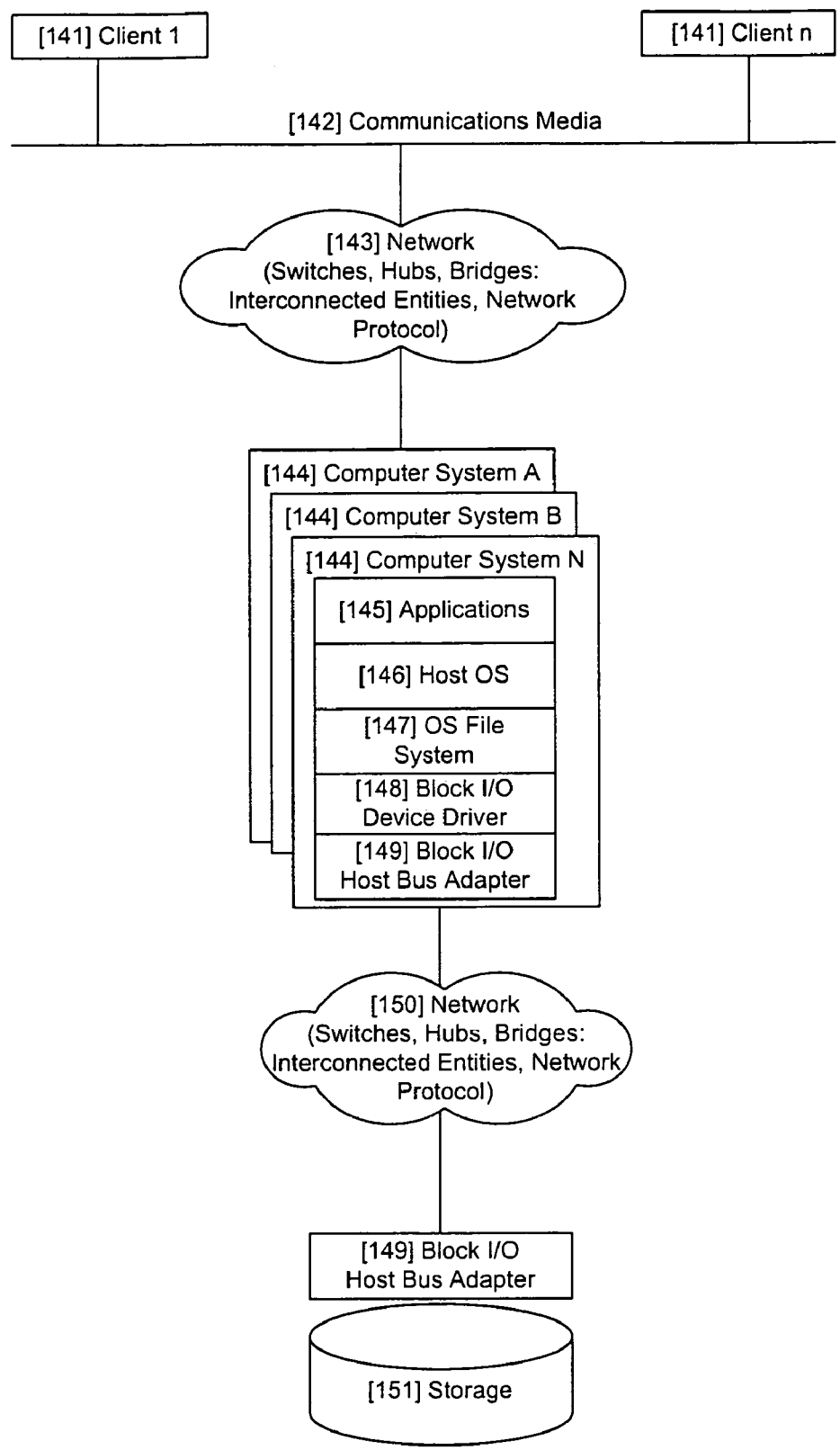
FIG. 3 is an exemplary block diagram showing a storage area network configuration.

FIG. 3 shows an exemplary storage area network configuration in which typically fiber channel hardware is utilized for routing requests via the block I/O host bus adapter 149 to storage 151.

Figure 4:
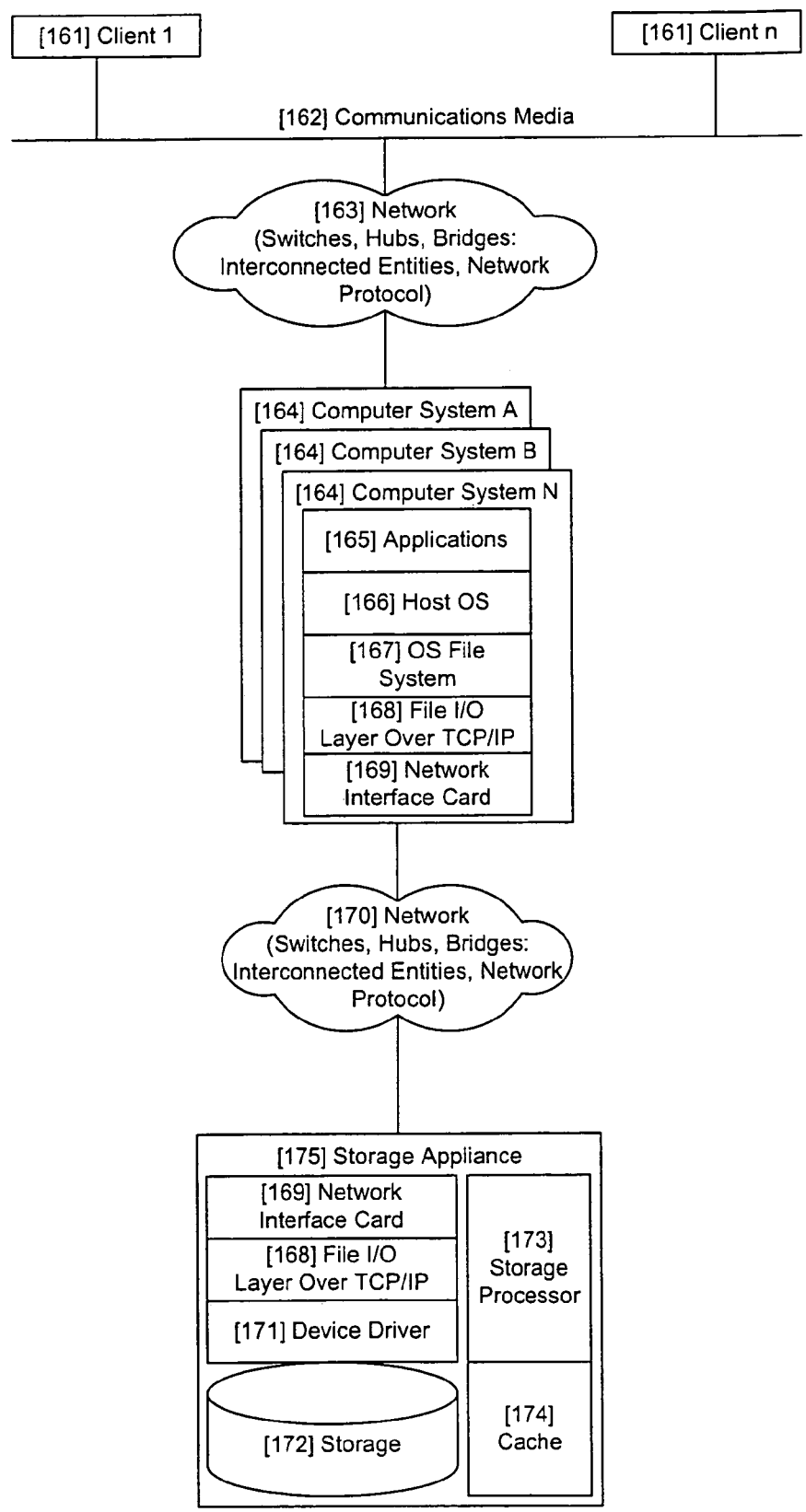
FIG. 4 an exemplary block diagram showing computers coupled to a NAS storage appliance architecture.

FIG. 4 shows an exemplary storage architecture referred to as NAS appliance architecture, which is a network storage that operates as a self-contained file server which is plugged into a network such as an LAN. In this exemplary embodiment, the storage appliance does not utilize the "iSCSI" protocol to communicate with the host computers. This exemplary storage is file storage rather than block storage. Such a system exemplifies lower end storage architectures which may be utilized in accordance with other exemplary embodiments of the present invention.

Turning back to FIG. 1, FIG. 1 is an exemplary direct attached storage architecture in accordance with an exemplary embodiment of the present invention. Clients (1 . . . n) 101 are computing devices which form part of the computer system depicted in FIG. 1. Client 101 may, for example, typically be a workstation, a wired or wireless handheld devices or a server. However, the client/participant may also be a specialized hardware appliance running a host operating system such as, for example, Windows CE, Windows XP, Windows 2003 Server, Linux, Unix and Palm OS.

The networked computers communicate with the FIG. 1 storage infrastructure via a communications media 102, which may be any wired or wireless media via which computer may communicate. Further, such communication may take place via a network 103 operating using any of a wide range of known methods and protocols via which the networked computers may interact with the storage infrastructure. For example, the clients 1 . . . n (101) may interact with a combination of mechanisms including, but not limited to, TCP-IP, NetBIOS, IPC, RPC, HTTP, FTP, SMTP, Wireless Ethernet, etc. Further, network 103 may be an IP Network that provides interconnection between various network devices, network segments and client computers 101 described above as well as the computer systems 104a, b . . . n referred to below. The network 103 may be of any of a wide network varieties and may typically include various interconnected entities that may include Ethernet switches, hubs and bridges.

Computer systems 104a . . . n are computers in a storage environment described below that can exist independently or as a cluster. A cluster may be a group of independent computers managed as a single system for higher availability, easier manageability, and greater scalability. Computer system components may be interconnected using specialized cluster interconnects or other clustering technologies.

Application software 105 is a program or a group of programs, that interacts with a host operating system 106 to perform a specialized task or group of tasks including but not limited to User Interface, File System Explorer, Server Infrastructure Management, Internet Browser and Database Application.

The host operating system 106 of the server infrastructure or specialized hardware appliance, and may be, for example, Windows 2000, Windows 2003, Unix, Linux, AIX. Host operating system 106 manages the hardware and software resources of the server infrastructure, including but not limited to processor, memory, 10 devices and provides a stable, consistent way for applications to deal with the hardware without having to know all the details of the hardware.

The computer system 104 includes a OS File system 107, which defines the overall structure in which files are named, stored and organized by the host operating system. Some of the common file systems which are contemplated for use include, for example, FAT, NTFS, CIFS (Common Internet File System), NFS and JFS (journaled file system). The logic of the described embodiments could potentially be implemented in conjunction with a file system driver and thereby provide the benefits of the remapping service utilizing standard external components and block device drivers. Further, the management of free versus allocated space could be readily synchronized between said file system and a variation of the described embodiments to further enhance performance with less necessary storage space reserved for the remapping logic.

The system additionally includes block I/O device driver 108 which is a program that control a mass storage device of its type on any bus, including but not limited to SCSI, IDE, Fibre Channel, and IEEE 1394. The program handles block I/O requests from user applications or operating system I/O services. It utilizes request blocks containing commands and translates into the format required by the underlying host bus adapter 109, which might be a Fibre Channel, SCSI or 1394 host bus adapter, IDE controller, or other such hardware, and issues commands to the storage device. The logic of the described embodiments could potentially be implemented in such a device driver, and thereby provide the benefits of the remapping service utilizing standard external components.

Computer systems 104 are operatively coupled to a block I/O host bus adapter 109 which, for example, includes hardware and microcode that provides physical interface to the mass storage device of its type on any bus including but not limited to SCSI, Fibre Channel and IEEE 1394. It sends and responds to block IO commands and transfer data to and from the mass storage device. The logic of the described embodiments could potentially be implemented in such a host bus adapter, provided it is configured with sufficient processing and short term memory storage, and thereby provide the benefits of the remapping service utilizing standard external storage components.

Computer system 104 communicates with the host bus adapter (HBA) 109 via communication link 110 which represents any of various protocols and channels via which the host bus adapter 109 communicates with the mass storage device 111. The HBA 109 interacts with any or a combination of mechanisms including, but not limited to, TCP-IP, SCSI, Fibre Channel, Wireless Ethernet, or other means. Block IO commands such as SCSI, transfer data between a computer and a storage device as blocks, which are low-level, granular units used by storage devices.

Mass storage device 111 stores data and may be, for example, a magnetic hard drive, optical drive or similar storage media. The storage device can exist independently and or as array of storage devices e.g. RAID, JBOD.

FIG. 2 is an exemplary iSCSI architecture in accordance with a further exemplary embodiment of the present invention. Clients (1 . . . n) 121 are computing devices which form part of the computer system depicted in FIG. 2. Client 121 may, for example, typically be a workstation, a wired or wireless handheld devices or a server. However, the client/participant may also be a specialized hardware appliance running a host operating system such as, for example, Windows CE, Windows XP, Windows 2003 Server, Linux, Unix and Palm OS.

The networked computers communicate with the FIG. 2 storage infrastructure via a communications media 122, which may be any wired or wireless media via which computer may communicate. Further, such communication may take place via a network 123 operating using any of a wide range of known methods and protocols via which the networked computers may interact with the storage infrastructure. For example, the clients 1 . . . n (121) may interact with a combination of mechanisms including, but not limited to, TCP-IP, NetBIOS, IPC, RPC, HTTP, FTP, SMTP, Wireless Ethernet, etc. Further, network 103 may be an IP Network that provides interconnection between various network devices, network segments and client computers 121 described above as well as the computer systems 124a, b . . . n referred to below. The network 123 may be of any of a wide network varieties and may typically include various interconnected entities that may include Ethernet switches, hubs and bridges.

Computer systems 124a . . . n are computers in a storage environment described below that can exist independently or as a cluster. A cluster may be a group of independent computers managed as a single system for higher availability, easier manageability, and greater scalability. Computer system components may be interconnected using specialized cluster interconnects or other clustering technologies.

Application software 125 is a program or a group of programs, that interacts with a host operating system 126 to perform a specialized task or group of tasks including but not limited to User Interface, File System Explorer, Server Infrastructure Management, Internet Browser and Database Application.

The host operating system 126 of the server infrastructure or specialized hardware appliance, and may be, for example, Windows 2000, Windows 2003, Unix, Linux, AIX. Host operating system 126 manages the hardware and software resources of the server infrastructure, including but not limited to processor, memory, IO devices and provides a stable, consistent way for applications to deal with the hardware without having to know all the details of the hardware. The logic of the described embodiments could potentially be implemented in the host operating system 26, and thereby provide the benefits of the remapping service utilizing standard external components.

The computer system 124 includes a OS File system 127, which defines the overall structure in which files are named, stored and organized by the host operating system. Some of the common file systems which are contemplated for use include, for example, FAT, NTFS, CIFS (Common Internet File System), NFS and JFS (journaled file system). The logic of the described embodiments could potentially be implemented in the OS File System 124, and thereby provide the benefits of the remapping service utilizing standard external components.

Block I/O layer over TCP/IP 128 is a program or body of logic that controls a mass storage device of its assigned type on any bus, such as SCSI, IDE, Fibre Channel, IEEE 1394, or other bus or other network architectures. The program handles block I/O requests from user applications or operating system 10 services and translates into the format required by an underlying adapter 129, such as Network Interface Card (NIC), Gigabit Ethernet Card, or other similar hardware, and issues commands to the mass storage device or appliance. The logic of the described embodiments could potentially be implemented in the Block I/O layer, and thereby provide the benefits of the remapping service utilizing standard external components.

Network Interface Card 129 is a hardware device and microcode that provides physical interface to the network of its type such as Ethernet, Gigabit Ethernet and interacts with the network over several likely protocols and channels such as TCP/IP, NetBIOS, IPC, RPC, HTTP, FTP, SMTP, Wireless Ethernet, etc.

As shown in FIG. 2 computer system 124 is coupled to network 130 which may be any network with protocols and channels via which the network interface card 129 communicates with the mass storage device or appliance. The NIC 129 interacts with a combination of various protocols and channels or other similar mechanisms such as TCP/IP, NetBIOS, IPC, kPC, HTTP, FTP, SMTP, Wireless Ethernet, etc.

The storage device 132 is a mass storage device for storing data that may be, for example, a magnetic hard drive, optical drive or similar storage media. The storage device can exist independently and or as array of storage devices e.g. RAID, JBOD. The storage device 132 interfaces with the network via a NIC 129, a block I/O layer over TCP/IP 128 and an I/O bus adapter 131. The bus adapter 131 is a hardware device and microcode that provides physical interface to the mass storage device of its type on any bus including but not limited to SCSI, Fibre Channel and IEEE 1394. It sends and responds to block IO commands and transfer data to and from the mass storage device. The logic of the described embodiments could potentially be implemented in logic and circuitry of the storage device, and thereby provide the benefits of the remapping service utilizing standard components at other points in the overall system architecture.

FIG. 3 is an exemplary block diagram of a typical storage area network (SAN) architecture within which an illustrative embodiment may reside. In FIG. 3, components 141, 142, 143, 144a, b, n, 145, 146, 147, and 148 correspond to previously described components 101, 102, 103, 104a, b, n, 105, 106, 107, and 108 and reference is made to the prior description of these components which need not be reiterated.

In FIG. 3, the computers 144 are coupled to a network 150. Network 150 denotes a communications network using any of various well known protocols, channels, routers, gateways via which the host bus adapter (HBA) indicated at 149 communicates with the mass storage device 151. The HBA interacts with a combination of mechanisms, such as, TCP-IP, SCSI, Fibre Channel, Wireless Ethernet. Block IO commands such as SCSI, transfer data between a computer and a storage device as blocks, which are low-level, granular units used by storage devices.

The HBA 149 is a hardware device and microcode that provides I/O processing and physical connectivity between computer system (144) and the mass storage device of its type on any bus including but not limited to SCSI, Fibre Channel and IEEE 1394. It receives an I/O request from the operating system and completely handles such activities as segmentation and re-assembly, flow control, error detection and correction, as well as the block I/O command processing.

Mass storage device 151 may include magnetic hard drive, optical drive or similar storage media. The storage device can exist independently and or as array of storage devices e.g. RAID, JBOD.

FIG. 4 is an exemplary block diagram of a typical NAS appliance architecture within which an illustrative embodiment may reside. In FIG. 4, components 161, 162, 163, 164a, b, n, 165, 166, and 167 correspond to previously described components 101, 102, 103, 104a, b, n, 105, 106, and 107 and reference is made to the prior description of these components which need not be reiterated. The file I/O layer over TCP/IP 168 is a program that controls mass storage device(s) of its assigned type on any bus, such as SCSI, IDE, Fibre Channel, and IEEE 1394. The program or body of logic handles file I/O requests from user applications or operating system 10 services and translates into the format required by the underlying adapter (169), such as NIC, Gigabit Ethernet Card, or other similar hardware, and issues commands to the mass storage device or appliance.

The network interface card 169 is a hardware device and microcode that provides physical interface to the network of its type such as Ethernet, Gigabit Ethernet and interacts with the network over any y protocols and channels such as TCP/IP, NetBIOS, IPC, RPC, HTTP, FTP, SMTP, Wireless Ethernet.

Network 170 is a communications network using any of various well known protocols and channels via which the network interface card (NIC) 169 communicates with the mass storage device or appliance 175.

Storage appliance 175 is a specialized hardware device designed to provide high performance block IO or file IO services within a storage network such as LAN, WAN and SAN. Storage appliance may consist of central processing unit 173 for performing computational and IO logic tasks, memory for caching services 174, network communication infrastructure 169, device driver 171 for communication with the storage array 172 and management software.

The device driver 171 is a hardware device and microcode that provides physical interface to the mass storage device of its type on any bus including but not limited to SCSI, Fibre Channel and IEEE 1394. It sends and responds to file IO commands and transfer data to and from the mass storage device.

The mass storage device 172 may include magnetic hard drive, optical drive or similar storage media. The storage device can exist independently and or as array of storage devices e.g. RAID, JBOD.

Prior to describing detailed methodology in accordance with the exemplary embodiments of the present invention, a discussion of certain foundational technology may be helpful. Logical storage relates to data presentation and management in the exemplary embodiments as it ultimately appears to the application data and/or file system contained on a volume, structured and organized according to the operating system's convention, logical block numbers, or other means appropriate to the operating system or other specialized application. The logical storage represents a conventional scheme, such as logically mapping each addressable block by contiguous monotonically increasing identifiers. Alternatively, logical storage arrangements could rely on combinations of drive/platter/head/cylinder, or other scheme of physical origins, to identify data locations. There may be multiple levels of logical storage mapping, though the term is broadly used herein and implies a drive geometry or addressing mechanism visible to the operating system or other applications that makes use of the mapped storage described below.

Managed space (or mapped storage) relates to the totality of physical storage which is provided as logical storage to applications or operating systems and typically includes a sequence of one or more zones, each a grouping of one or more distinct storage media or partitions therein, such as independent drives, partitions or RAID arrays, which are then aggregated to form contiguous logical storage for applications, subject to the dynamic remapping provided by various embodiments of the invention.

Data is typically stored in specialized physical data storage devices, though it may be temporarily maintained in random-access memory cache, likely with battery back-up or other short-term persistence measures, and ultimately on physical moving media, such as a conventional magnetic hard disk, optical disk, or similar electromechanical recording mechanism. A temporary random-access memory cache may be used to enhance operations by keeping frequently or recently accessed data in rapidly accessible memory. The same cache-like management techniques may be used to maintain update information between the time the update is received and when it is ultimately processed.

A Redundant Array of Independent Disks (RAID) is a storage arrangement of which there are many variations. Multiple drives are logically coupled to provide a larger composite storage entity that exhibits better storage capacity, performance and/or reliability than a single drive or a group of unrelated drives would provide. In an exemplary embodiment, the three building blocks of RAID are mirroring, multiple identical copies of a drive image are maintained, RAID 5, in which data is spread over N drives such that every group of N−1 blocks of data, each stored on separate drives, has a corresponding block of parity that can be used to recover blocks from a single failed drive, and striping, in which redundancy is not improved, but multiple drives are logically coupled to create a larger apparent storage volume. These various techniques are used alone and in combinations to provide performance and reliability suitable to particular environments. RAID is a standard term in the storage industry and its use here refers to the spectrum of capabilities unless otherwise stated. The exemplary embodiments will often make use of common RAID techniques for underlying physical storage. The RAID array(s), regardless of their actual configuration, provide composite storage areas, from the perspective of the preferred embodiment, which are treated as one or more zones for purposes of the invention. The performance of the resultant storage area is dramatically increased. The various embodiments can utilize the storage provided by one or more RAID arrays, alone or in combination with other storage media, to provide the benefits of RAID further enhanced by the dynamic remapping service and consequently improved update and write performance.

A volume or logical volume, or logical region of storage is typically made available to an operating system, through its volume mounting or similar mechanisms, or to a particular set of applications, such that the implementation of the dynamic reorganization is transparent to the operating system or applications that make use of the logical volume. A single logical volume is typically maintained in one or more zones, subject to the dynamic reorganization and related methods, which are dedicated to the particular volume's needs or shared with other volumes, as determined by the particular embodiment or its configuration. The concept of volume is also present at a lower level, implemented by disk array technologies, such as RAID, that provide the physical zones in which actual data is stored. The lower level concept is usually referred to herein as physical storage or zones, which are ultimately referring to physical storage.

A zone is a convenient term to refer to a separately and independently accessible region of storage space. Multiple independent physical storage devices, or partitions therein, could each be designated as separate zones, multiple RAID arrays could each be designated as a zone, etc. A zone is a configured storage space that is meaningful to the exemplary embodiments for optimization purposes. It is desirable, though not essential, that no access to one zone should significantly interfere or limit concurrent access to other zones. All zones used as part of a single managed space may be required to have certain common properties determined by the particular embodiment. The preferred embodiment allows the addition of zones at any time after the managed space is first prepared, providing general constraints and available resources permit.

A zone block is a single logical block of storage within a zone at the smallest addressable level. For purposes of the exemplary embodiments, each Zone has a set sequentially numbered zone blocks. All blocks in a particular zone are the same size, typically, but not necessarily, 512 to 4096 bytes and normally a power of 2.

A zone has properties as configured for use by the exemplary embodiments. The zone properties include information on the zone block size, the zone cluster size, the degree and patterns of independence of numerically adjacent storage clusters, and so on. Zone properties are used in various embodiments to meet algorithmic needs or provide particular optimizations that may be applied. Zone properties may be stored in conjunction with overall managed space configuration information, independently, or in any practical combination. The preferred embodiment replicates all zone configuration and managed space configuration in a reserved area in each zone.

MAP Information is information that collectively specifies the mapping between logical units of storage, which can be blocks, clusters or some other unit, and the physical storage which comprises the managed space. This information is used to maintain the dynamic relationship between logical addressing of storage and the physical location in which information is stored. This term also includes the information that manages the state of each unit of physical and logical storage with regard to active/inactive and possibly related caching status, such as cached, read pending, writes pending, and so on. The MAP information is stored in one or more MAP Areas within the physical storage, each referred to as a MAP Area Segment, likely "inverted" when compared to the memory-resident form, that is each successive entry maps a successive physical block to a logical block, rather than the other way around. The MAP Information is also maintained in rapidly accessible memory to allow the translation to be performed without additional physical accesses. In the rapid access form, the map stores successive physical location identifiers for each logical location, or a reserved value if the logical location is not presently used (never written or written and subsequently released by some mechanism). The actual MAP Information may be maintained completely in a RAM-like structure or in a cached arrangement, where a significant portion is maintained in RAM and other MAP Area information is loaded as-needed and on a predictive basis based on a cache scheme.

A Region MAP Segment is a segment or region of physical storage in which the mapping between logical units of storage, which can be blocks, clusters or some other unit, and physical storage is maintained along with the state of each physical and logical block. The state information may be stored separately, implied or derived from other information, or some combination thereof, based on efficiency and storage tradeoffs in the particular implementation. MAP segments or information are likely, but not necessarily, distributed at strategic locations throughout physical storage, referred to as regions in the preferred embodiment, such that a given map area segment resides near the related physical storage, also such that an update to storage involves physical writes of the newly written data and region map Area regions in close proximity.

Figure 5:
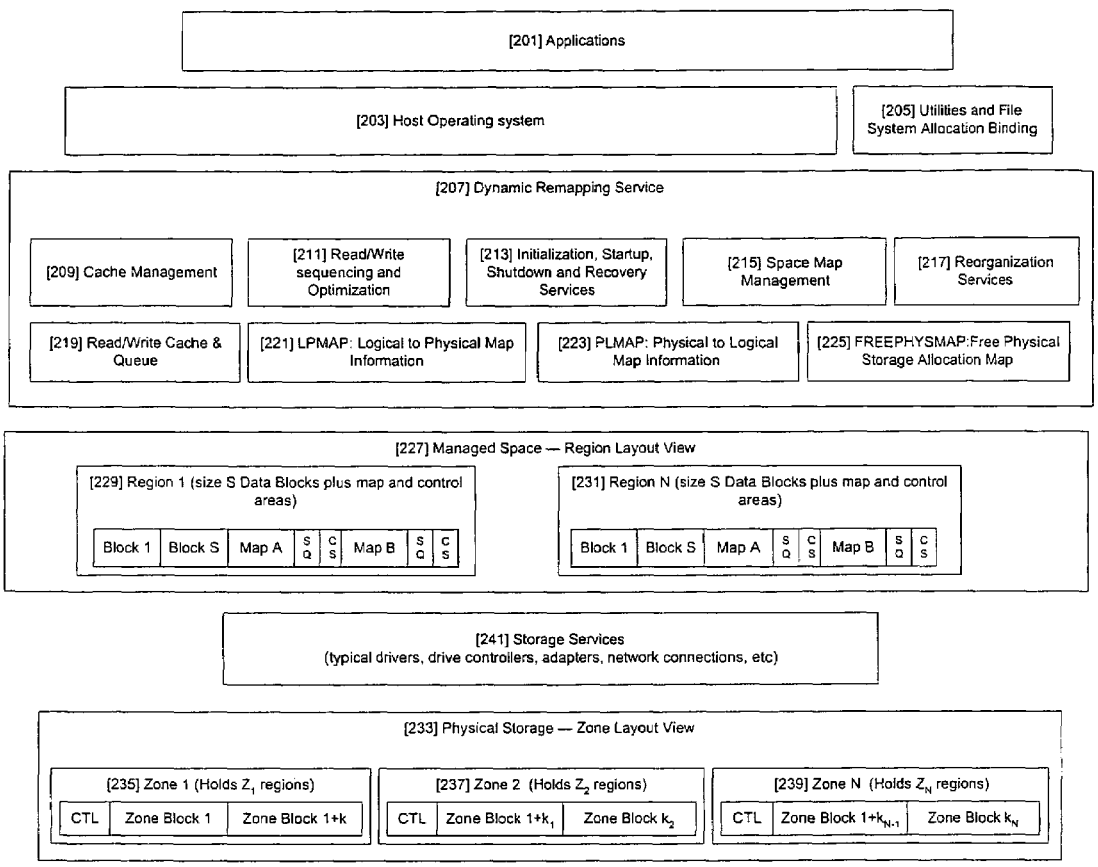
FIG. 5 is an illustrative block diagram which shows various components which utilize an illustrative dynamic remapping service methodology in accordance with an exemplary embodiment(s).

FIG. 5 is a block diagram which shows various computer system/storage components which are part of, utilize, or interact with the dynamic remapping service 207 in accordance with the exemplary embodiments described herein.

Applications 201 denotes illustrative user application software which will require storage of a high volume of business transaction data on disk. Most application software can utilize the benefits of the dynamic remapping service described herein without change. However, certain applications may be desirably enhanced to interact with the dynamic remapping service 207 to further enhance transaction intensive applications. For example, a database application which recognizes the existence of the dynamic remapping service 207 may be programmed to operate more efficiently.

Applications 201 will, of course, run under an operating system such as host operating system 203. The host operating system 203 may, for example, be co-located with the dynamic remapping service 207 or operated in distinct systems as when the dynamic remapping service is used in a NAS/SAN-like fashion.

The utilities and file system allocation binding component 205 is the software which determines which particular drive or partition is to be designated for use. The utilities and file systems allocation binding 205 is typically associated with the host operating system 203 and ensures that, for example, applications and operating system programs know where to go for data.

The dynamic remapping service 207 represents the remapping logic utilized in conjunction with variations of the exemplary embodiments described herein and is responsible for the management of changing mapping of where data is stored in order to optimize the data storage and updates to such storage. The dynamic remapping service 207 is represented as including exemplary components in accordance with an illustrative embodiment. The components in the dynamic remapping service 207 may be implemented in software or specialized hardware. Further, an embodiment can be implemented in dedicated processing hardware or it may reside in other aspects of the environment, from the general purpose computer and its operating system, file system, or device drivers, to host bus adapters, storage subsystem controllers, or the storage devices themselves.

The dynamic remapping service 207 may operate in: 1) a general purpose computer system in conjunction with application software, 2) host adapter hardware installed in such a computer system, 3) a dedicated storage processing system resident in an external, attached or integrated storage system, 4) a disk drive's on-board controller, or 5) at any other suitable point in the system between the physical media's onboard logic and the ultimate application(s) accessing the data.

Cache management 209 manages cache memory to ensure that frequently accessed information may be rapidly accessed by storing such data in a high speed memory. In this fashion, such data need not be physically re-read from the drive.

As noted above, the dynamic remapping service 207 is responsible for the continuous management of changing mapping of where data is stored in order to optimize the data storage performance. Read/write sequencing and optimization 211 is the core logic which decides in what order operations are to occur to optimize the storage configuration. The read/write sequencing and optimization component 211 utilizes the relatively brief time window where there is some latitude in read and write operation sequencing.

The initialization start-up, shutdown and recovery services component 213 controls operations which are required or desired to occur in the computer system such as initialization start-up, shutdown and recovery. These conventional operations occur outside of normal dynamic remapping operations.

The space management component 215 is the logic which ensures that there is an accurate map of storage space. It ensures that the storage space utilization is known as to what information is stored at particular locations.

Reorganization services 217 is the logic which controls optimizations done after dynamic remapping service operations. Reorganization services 217 preferably operates during, for example, idle time to handle long term optimization operations without consuming resources required to respond to read and update requests during normal operations.

Read/write cache & queue 219 is a data structure which stores information that is read and written with information that the system desires to save for subsequent use with respect to currently pending matters. For example, the read/write cache & queue 219 would maintain information on read requests that are outstanding, write requests that have not been fulfilled and acknowledged, recently read or written data that the cache algorithm decides to save, and the status of all pending operations. As further examples, the queue could incorporate logic to assist in the optimization process, such as maintaining pending requests organized by physical (read) or logical (write) locations. Further optimizations would be performed by the appropriate logic, which may be external or internal to the read/write cache & queue 219, as necessary.

LPMAP 221 is a data structure storing logical to physical map information, which stores information mapping a logical location to a physical location. It contains information as to where each piece of logical data is physically stored or an indication that the particular logical block has not yet been written and assigned a physical block or was written and subsequently released by some event. LPMAP may be itself partitioned by a further mapping process to allow multiple independent domains or volumes of data to be present in one managed space. In this embodiment, a further mapping exists between ranges of logical blocks in each logical volume and one or more contiguous ranges of the LPMAP space. The result allows multiple data volumes to coexist in one managed space. Other aspects of operation remain the same, although operations to various logical blocks may ultimately be on behalf of distinct data volumes, which may be accessed by distinct and separate computer systems or operating systems. PLMAP 222 is a data structure storing physical to the logical map information. It contains information indicating that data at an identified physical storage location contains data for a particular logical block or an indication that the particular physical location is not presently used FREEPHYSMAP 225 is a data structure that stores a free physical storage allocation map. FREEPHYSMAP 225 indicates what space within physical storage is free and which space is used. A flag, for example, may be set to a logical state indicating that the space is either free or in use. It should be noted that, in accordance with an exemplary embodiment, the LPMAP 221 and PLMAP 222 each contain sufficient information to generate LPMAP 221, PLMAP 222 and FREEPHYSMAP 225. A particular embodiment may choose to preserve all or some of these data structures on an operational basis and generate or infer the others, or the information therein, on an as and if needed basis.

The various components of dynamic remapping service 207 including read/write sequencing and optimization component 211, the space map management component 215, LPMAP 221, PLMAP 223 and FREEPHYSMAP 225 are explained in detail further below in conjunction with the explanation of the flowcharts in FIGS. 6-9.

The managed space—region layout view 227 is a showing as to how information is stored on disk in accordance with an exemplary embodiment of the present invention. The managed space 227 maps a logical space provided to applications or an operating system to a sequence of regions, located in one or more zones. A region comprises multiple data blocks, which can be individually and atomically read or written, and an area, also utilizing one or more blocks that is used to persistently capture the current mapping and context information for the system. The number of blocks in a region, the allocation and organization of the blocks between mapping, context information and data is specific to (and will vary with) the application and is typically constant in layout through one managed space. The region control information is typically maintained with two copies, each with a sequence number (SQ) and an integrity check or check sum (CS) used to select the appropriate (most recent correctly and completely recorded) instance at start-up.

In managed space 227, in accordance with an exemplary embodiment, the physical space is used as a sequence of equal sized blocks where, for example, each block may include 1024 bytes (or any other consistent size suitable to the requirements of the particular implementation). The managed space refers to all the physical storage space that is available to the dynamic remapping service 207. One way of organizing such space is to divide the space up into regions 1, 2 . . . N as is represented in FIG. 5. Each region contains a sequence of physical blocks 1 . . . S, which physical blocks may be mapped to logical blocks or unmapped/free at any given time. Blocks 1 to S, which are all the blocks in the region, at any given time store data in one or more of the physical blocks. Map A and map B are fragments of the physical to logical map (PLMAP) 223, and indicate, for each block in the region, what logical block it contains. The information stored in the map/control area is designed for subsequent recovery or start-up, but is not strictly necessary during ongoing operation of the illustrative embodiments. As a result, an implementation may choose to ignore this feature if, for example, through other means, such as power safe map storage available to the algorithm, it is known that a proper logical to physical map is otherwise consistently maintained.

In accordance with an exemplary embodiment, a hundred write requests, for example, may be received that correspond to data previously stored at locations scattered throughout the RAID array. The dynamic remapping service 207 may decide that those writes will store data in a region 1 . . . N, e.g., region 1. The data may be written successively into many blocks in the selected region. One of the two map regions, map A or map B is then rewritten with the corresponding information from the physical to logical map 223. Thus, data is written into region 1 and, in addition, either map A or map B, whichever hasn't been used in the longest period of time, stores the appropriate fragment of the physical to logical mapping information 223. A sequence number (SQ) is written which may be viewed as a compact time stamp, along with a check sum (CS) so that if data recovery is necessary the appropriate mapping information, i.e., the newer mapping information may be utilized for data reconstruction.

In this fashion, data may be packed efficiently on the disk and the mapping information can be assured as being persistent by having both a map A and a map B. Thus, in a recovery operation, both map A and map B may be read and a decision made as to which map contains the most current and complete information for reconstructing the map information for the related physical blocks. Map A and map B contain a current and previous copy of the physical to logical map information to ensure that there is always a backup copy of the mapping information. This system permits recovery under circumstances where a write operation to an array only is partially completed. If the memory in which the mapping information 223 is stored is persistent, i.e., in a battery backed up memory in the storage system, then the maps need not be written to disk in accordance with an exemplary embodiment. Such battery backup storage techniques may be used utilized with regard to LPMAP 221 and FREEPHYSMAP 225. If, for example, in such a battery backup implementation, the backup battery were to lose battery power, the system should be designed to automatically write the mapping information to a hard drive or other persistent storage to ensure that mapping data is not lost.

In accordance with at least one alternative embodiment, a system may operate without a PLMAP 223 for memory saving purposes. As just mentioned, when the implementation has a sufficient battery backup and other techniques to assure that its LPMAP is continuously maintained, it is not necessary that PLMAP 223 be maintained, or that the corresponding information be written into the physical media as part of a region structure or other means.

The system also utilizes storage services component 241 which includes typical drivers, drive controllers, adapters, network connections, etc. The storage services 241 includes whatever devices are being required in a given exemplary embodiment to communicate with the associated physical drives.

Physical storage 233 includes zones which are a sequence of storage resources which are logically concatenated to form the managed space 227. The distinct zones 1 . . . N provide the opportunity for performing operations in parallel as data is continuously redistributed across all zones during the I/O distribution process.

A reserved number of blocks are present in the exemplary embodiment at the beginning of each zone, which contain information specific to the zone's operation and may contain redundant information regarding all the overall managed space configuration, links to other zones, etc. The size of this reserved area may be, for example, constant and fixed by the implementation. The blocks in a zone are either reserved for zone control information or assigned to regions as depicted above. Each zone contains, in the exemplary embodiment, an integral number of regions and may have unused space at its end up to the size of a single region.

In a practical exemplary embodiment, the physical storage layout will utilize multiple drives, configured into one or more arrays as appropriate to the data capacity and performance requirements. Zone 1 (235), Zone 2 (237). . . zone N (239) (which may be referred to by those skilled in the art using different terminology) are independently addressable and accessible storage locations. For example, one disk array having a large number of blocks may be viewed as zone 1, another disk array with twice the number of blocks (or any number of blocks) may be zone 2 and a further disk array having four times the blocks of zone 1 (or any number of blocks) may be zone N. The ordered sequence of these zones compose the collective physical space used by the embodiment to create the logical space.

As shown, for example, in zone 1 (235), a control area CTL is reserved at the beginning of the zone, where managed space and zone control information is stored to indicate where the zones are and related administrative information. These zones are partitioned into regions as described above. The control information for the entire sequence of zones or any particular zone is preferred as indicated, but may be stored in any manner convenient to an embodiment.

Prior to describing the processing operations in detail in conjunction with the flowcharts of FIGS. 6-9, the dynamic remapping operations in accordance with various exemplary embodiments will first be described. As shown in FIG. 5, in accordance with an exemplary embodiment, dynamic data reorganization is implemented using a dynamic remapping layer 207 and a sequential optimizing re-allocation strategy to provide proximately maximal contiguity for write operations. The exemplary embodiments add a remapping process that increases locality of reference for writes to approach the pure sequential write throughput limit, or other metrics which may apply to approach the peak write capacity of the set of available physical devices, subject to necessary available sparsely allocated space.

As will be explained further below in conjunction with the update/write processing shown in FIG. 7, as logical write requests are received, they are briefly queued in read/write cache & queue 219. The queued logical writes are uncommitted until they reach the battery backed up portion of the implementation, if any, or until they are ultimately written to physical storage, e.g., disk, 233. Most implementations and the preferred embodiments would use a power assured processing and memory component, including controllers with battery back up, to allow logical writes to be confirmed and committed as early as possible.

In the write queue, the writes are assembled to meet optimization goals and scheduled for writing to available space in one or more zones 235, 237, 239. Proximate logical blocks would normally be kept reasonably contiguous as they are written to storage zones. Unrelated logical blocks, those distant in the logical space numbering scheme, are potentially scheduled for concurrent writing to independent zones of storage. Each logical block is ultimately assigned to an unallocated physical block, with the blocks being chosen from regions (or, in alternative organizations of the space, appropriate areas of the managed space) with above average space availability (or some other criteria as appropriate), and then regions in one or more zones of data are written, including updating the affected physical-to-logical space maps (map segments) for all updated data. The memory resident PLMAP, LPMAP, and FREEPHYSMAP are all updated appropriately as the updates are processed. The optimizations attempt to provide up to the maximum available streaming concurrent write bandwidth to all zones. At lower demand levels, the optimizations may favor resultant space organization over absolute peak write throughput, such as preferring to fully pack more dense regions, rather than seeking regions with sufficient free space to provide near sequential performance. An optimization such as this, at lower demand levels, leaves the data distributed more bi-modally, thus providing more opportunities, in the form of sparse regions, to improve performance at a later time.

Each map segment has an update sequence number that is used during start-up or recovery to resolve multiple references of physical to logical mapping. In an exemplary embodiment, only the physical to logical mapping with most recent update sequence number is saved for a given physical to logical mapping, with any other mapping ignored and the referred physical space for such obsolete mappings being identified as available during recovery. Multiple copies of the map segment are allocated in the storage space, such that only the oldest is updated when the region's mapping is changed. During recovery, the sequence number and checksum of each map segment for a region are compared to determine which such map segment is the most current complete mapping information. The sequence number of the selected instance is then used for all mappings in that segment to arbitrate among multiple physical to logical mappings that identify the same logical block, such that the physical to logical mapping with the later sequence number takes precedence and is retained if multiple physical blocks refer to the same logical block. During ongoing operation, an exemplary embodiment will maintain current mapping information at all times and incrementally record the information to persistent storage as necessary for potential future recovery. Other embodiments may use different approaches to this persistent mapping storage, provided that such embodiment ensures the map information can be properly recovered consistent with all confirmed data upon subsequent restart, startup or recovery.

The queuing and subsequent writing is typically done on a continuous basis, or based on criteria appropriate to the particular environment. Regions of the managed space are identified for the next group of write operations based on the density of free space therein or other suitable criteria. The optimization may then be as simple as ordering the logical blocks by number, assigning the first to an available physical block, assigning the second to the next available physical block, and so on. When the data is written, the previous physical block, if any, for each logical block, is marked free once the process completes. Each time a space map is updated, a sequence number is also written to allow recovery logic to identify stale mapping data that would be present elsewhere in the physical storage.

In some implementations, the logical blocks would be isolated into multiple streams that would each be written in a concurrent manner to physically independent media (sometimes referred to as different zones). Depending on the implementation of the physical media, massive writing to a RAID-like physical storage system, given the high degree of locality of reference in writes, would provide many of the benefits of isolation into multiple streams to orthogonal zones by higher level logic. The decision of the degree of optimization in the higher level logic is based on the range of configurations of physical storage anticipated, the type of logic and queuing present that directly manages the storage, the level of performance that must be attained, and the available processing power and memory to the optimization logic.

For each logical block, the first write will be typically assigned an arbitrary physical block, subject to optimizations that attempt to minimize the distance between logical blocks which are written in close time proximity, thereby maintaining sequential performance for clusters of data that are written in either pure sequential logical form or are potentially being assembled randomly for subsequent sequential access. The amount of time allowed and the degree of optimization is dependent on the specific configuration, though sequentially written logical units of storage should be subject to significant optimization to maintain sequential read performance at later times.

In many cases, a combination of two facets will be used to provide the desired blend of performance and potential storage utilization. The two primary facets involve mapping of logical to physical storage and the need to have a sufficient level of physical and active logical storage in order to assure performance levels.

In one case, called hidden storage, physical storage exceeds logical storage by a defined factor and the additional physical storage is not exposed at the logical level. For example, 2 TB of physical storage appears as 1 TB of logical storage and ensures at least a 2:1 ratio or 50% physical utilization level. In this scenario, the illustrative embodiment can function at a predictable high-performance level without information regarding active/inactive status of logical blocks.

Most implementations would supplement the hidden storage approach with real-time or periodic updates that inform the implementation (and consequently its mapping tables and storage status information) of inactive logical blocks. This allows corresponding physical storage to be used to enhance performance rather than hold stale data. In any case, data would be considered inactive until first written as a logical block. Any read to a previously inactive block would return empty data or an error, configurable to suit the environment.

It is also possible to maintain the physical to logical storage ratio at or near 1:1, though some reserve in the form of hidden storage is highly recommended. In this scenario, information regarding inactive logical data is essentially required and should be communicated to the appropriate component of the implementation in a timely manner. As the utilization ratio approaches 100% or exceeds the ratio at which required performance enhancements occur, performance will suffer, though the maximum amount of storage is available.

In a typical case, a combination of hidden physical storage, such as a ratio of 3:5 or 4:5 logical:physical would be maintained in conjunction with active/inactive status information for each logical block. This provides a balance of protection against seriously degraded performance that would occur if the ratio were 1:1 and storage utilization approached 100%, while allowing free space in the logical domain to enhance performance.

In an illustrative embodiment, inactive mappings are immediately reflected in high-speed memory and then are added to reserved entries in region maps as regions are written and subsequently when the affected regions, those with physical to logical mappings for which the logical block is marked inactive, are passed in round-robin fashion, their respective region maps are rewritten and serialized. This approach allows for real-time inactive mapping changes to be processed without thrashing that may result if affected region maps were directly updated as individual events occurred. The initialization of the system would be updated to analyze the invalidation entries once the primary process of loading mappings is complete. Any invalidation entry in region map would be ignored if the referenced physical region has a newer sequence number, or, the physical to logical mapping would be removed and the corresponding physical space marked free.

Persistent RAM Assisted Implementation

In one illustrative embodiment, it is presumed that the non-uniform random access memory is the only safe long-term persistent storage available. As a result, physical to logical mapping information, sufficient to recreate logical to physical mapping in a subsequent restart, is interleaved with the data update process.

In some environments, it will be preferable to provide a persistent uniform access time memory subsystem, potentially implemented as a battery backed up memory subsystem with redundant control processors and fully error correcting memory on an expansion card suitable for the target environment. The card would contain memory necessary for long-term management of the logical to physical storage mapping for one or more managed spaces and provide interfaces to read and update the information as necessary, while providing protection from corruption by the operating system or errant code executing on the system.

In this alternative embodiment, the map information associated with each region in physical storage and written when any blocks in such regions are updated becomes optional and the map information is only extracted from the memory board and written to a safe area in the managed space when preparing for a long-term shutdown. The region organization becomes totally arbitrary and unnecessary in such an embodiment, as regions are a convenient defined boundary for corresponding map information, only necessary if persistent map information must be mechanically stored at or near the time of data update. In other words, when persistent high-speed nearly uniform access time memory is available and used exclusively for map information, the collection of physical space can be modeled an extensible linear sequence of blocks, with no additional structure required. An embodiment may still choose region-like structures to simplify optimizations, but no such structure is implied or necessary in this alternative embodiment.

Other Illustrative Embodiments

A wide variety of other embodiments are contemplated. For example, exemplary embodiments can be embedded at multiple points in the storage processing chain:

1. processing units embedded within external storage devices or subsystems;
2. processing units or controllers providing access to external storage devices or subsystems;
3. the application itself;
4. a database application, that provides tools and general support for SQL or non-SQL database services to other applications;
5. the operating system and its device drivers and storage management logic;
6. processing units embedded within particular storage devices, such as disk drives In one illustrative embodiment, the methodology operates to enhance performance of a non uniform access time persistent storage subsystem, such as external storage subsystems on computer systems or network attached storage. However, implementations are contemplated that are applied to specific applications within an operating environment by providing the services in an environment where the zones are actually dedicated storage or files in a traditional environment. Such implementations allow specific applications to be enhanced without changing the underlying storage or operating environment. In this scenario, the implementation will require adjustments to provide transaction safe storage to the application. The standard techniques for providing transaction safe processing can be co-located with the implementation itself, provided at a lower level with pass-through to the application layer, or potentially managed by the application itself. The details of the transaction processing and providing appropriate atomic services beyond individual disk writes are specific to the application and environment.

Mapping Table in Multiple Versions, Rotated on Each Pass, Ensures a Clean Copy is Already Available In some implementations, the mapping segments will be stored with two versions, with each group of updates reflected on one of the mapping segments versions to allow detection of partial updates and ignore remapping if the segment wasn't completed. This provides a fail-safe recovery mode in the event that battery-backed up disk controllers are not functioning or not available.

Physical to Logical Mapping Data Structures

In one illustrative embodiment, both logical to physical and physical to logical mapping information are maintained in high speed substantially constant time memory (e.g., RAM). However, an embodiment could also be implemented with only a logical to physical structure in such memory, reducing the demands on high-speed memory in this scenario, by, for example, pre-reading affected region map segments and then revising the segments to reflect the newly written data. Since physical to logical mapping is only strictly needed to compute the previous, not new, contents of a region, this removes the need for the large physical to logical data structure in the implementation and reduces by approximately 50% percent or more the amount RAM required.

If no battery back up is present, an exemplary implementation will not confirm a write until the write, and all of its predecessors, are physically written or have reached a safe persistent state.

Background Reorganization

An exemplary implementation may include a continuous or intermittent reorganization process which organizes data either according to logical block continuity or based on historical access patterns. This approach would utilize otherwise free bandwidth to read and re-write data to maintain optimal read performance when such reorganization can materially affect proximity characteristics for random or sequential reads. This can be performed either independent of the upper layers, such as the operating system and its file structures, or with cooperative involvement using a utility that collaborates with the operating system or file system to provide both logical and physical reorganization of the data.

In accordance with one embodiment, the reorganization process uses idle time to compact free space within regions and between adjacent regions with free space. Other embodiments may combine this technique with a process that moves adjacent logical blocks into adjacent physical blocks. More sophisticated approaches may utilize access statistics to select organization patterns that optimize use of available independent storage zones and physical proximity within each, to match data access patterns.

Figure 6:
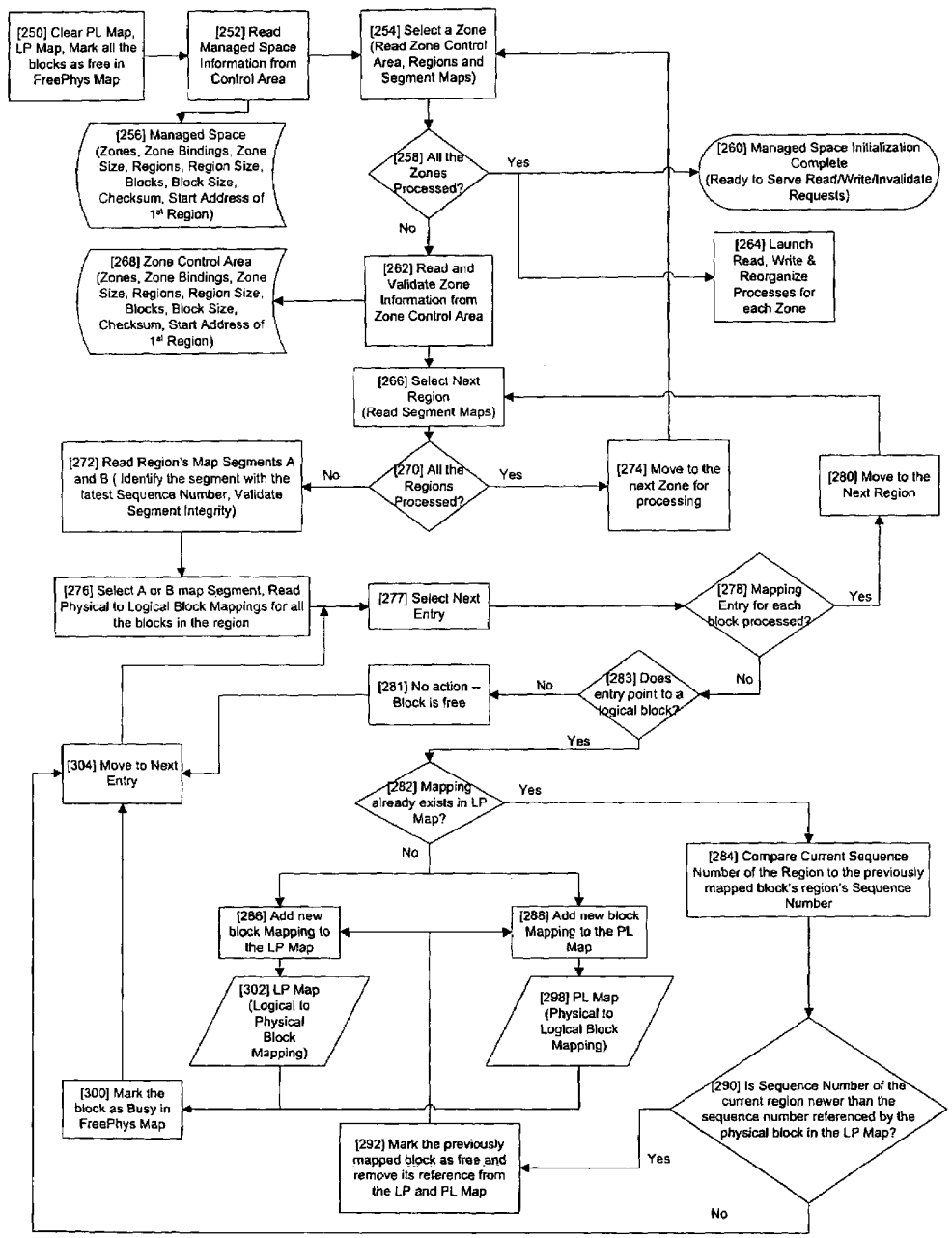
FIG. 6 is a flowchart depicting the sequence of operations involved in initializing the system in accordance with an exemplary embodiment of the present invention.

FIG. 6 is a flowchart depicting the sequence of operations involved in initializing the system in accordance with an exemplary embodiment of the present invention. As shown in FIG. 6, each of the various maps described above such as the physical to logical map and the logical to physical map, are first cleared. An indication that the blocks are free is stored in the FREEPHYS Map (250).

The system then reads the managed space information from the control area in the zones depicted in FIG. 5, such as zone 1 235, CTL (252). The managed space is read to obtain basic information about the zones that are being managed about which the system needs to know. Such information which is obtained during the processing indicated at 256 and/or 258 includes information as to what zones compose the space, the zone bindings which indicate how to find the physical storage, the size of the zone. Other characteristics of the zones of data which need to be tracked in accordance with the exemplary embodiment are also read such as regions, region size, blocks, block size, check sum, and the start address of first region.

Thereafter, the zones are read sequentially. Initially, a zone is selected and its zone control area, regions and segment maps are read (254).

A check is then made to determine whether all the zones are processed (258). If all the zones have been processed, then the system launches read and write and reorganize processes for each zone (264). Overall system performance is enhanced by processing on a zone by zone basis, since as indicated in block 264, in an exemplary embodiment, each zone is operated on to subsequently perform the read, write and reorganize processes, employing multi-tasking parallel operations utilizing one or more actual processors as appropriate to the performance requirements. Further, each zone, as shown in the illustrative embodiments, represents separately and independently accessible storage, thereby allowing overall performance to be increased as workload is distributed optimally across the available zones.

As indicated in block 260, when all the zones are processed, then the initialization is complete and the system is ready to serve read/write requests. In some embodiments, "invalidate" requests may also be present to indicate that particular logical blocks no longer contain meaningful data, such as when files are deleted on a file system volume. These requests would involve operations similar to a write, though no physical block is allocated or written. Instead, the FREEPHYSMAP, LPMAP and any PLMAP information are updated to reflect the data is no longer used and mark any previously mapped physical storage as free. As with all remapping, this information should be captured in a suitable persistent fashion. One approach would utilize a set of "invalidate" entries in the map regions, each entry indicating a physical block whose prior contents are invalidated. On recovery, the sequence numbers of the region map with the invalidate would be compared with the sequence numbers of regions with corresponding physical to logical mapping to determine if that mapping had been cancelled. Such an approach would require an exhaustive round-robin scheme for write determination and tracking of regions that have stale mapping by reason of invalidation, so that they are subsequently updated prior to the region in which the invalidation entry was posted.

If all the zones had not been processed, then the system reads and validates zone information from the control area (262). The zone information from the zone control area that is read is indicated in block 268 and includes the zones, zone bindings, zone size, regions, region size, blocks, block size, check sum, and the start address of the first region. In block 268, any of the above-described information which had not been read in during the read operation at block 256 is read during the block 268 read operation.

Within each zone, a region is selected and segment maps are read with respect to the selected region (266).

Thereafter, a check is made to determine whether all the regions have been processed (270). If so, then the system moves to the next zone for processing (274). If not, each of the above-described map segments A and B are read for the region. Each of the map segments A and B will have a sequence number which is incremented upon any write to any segment, thereby serving as a compact timestamp for later comparison purposes.

After a region's map segments A and B are read, the respective sequence numbers of map segments A and B are identified and the highest sequence number is selected. Additionally, the check sum value is checked to ensure that the map segments A and B were each completely written (276). If one of the segments A or B has an invalid check sum value, its contents are ignored and the other segment will be utilized, provided that it has a valid check sum value.

The physical to logical mappings in the selected segment are read and used for all the data blocks in the region for which there is one entry each. For example, if there are ten blocks followed by a map region, there would be ten entries in the physical to logical map segment which indicates the corresponding logical block for each physical block or an indication that the physical block is presently unused (i.e., free, unmapped).

After the processing at 276, the next entry is selected (277) and a check is made at block 278 to determine whether a mapping entry for each of the blocks has been processed in the selected map segment. If so, the routine moves to the next region (280) and branches back to block 266, in which a region is selected. If not, a check is made to determine whether an entry points to a logical block (283). If not, no action is taken (the block is free) (281) and the routine moves to the next entry (304, 277).

If the entry point does point to a logical block as determined at 283, a check is made to determine whether a mapping already exists in the LPMAP (282). The check at block 282 determines whether some region which was previously read already claimed the same logical block to be utilized. If not, then the new block mapping would be added to the logical to physical map (286) and to the physical to logical map (288). With respect to block 286, the corresponding physical block identifier is added to the LPMAP. The current physical block is also associated with a logical block at block 288. Thus, as indicated in FIG. 6, the LPMAP data structure 302 and the PLMAP data structure 298 are updated.

Thereafter, the block is identified as being busy in the FREEPHYS map (300). The routine then moves to the next physical block's mappings. After moving to the next physical block (304), a check is made to determine whether the mappings for all blocks are processed (278).

Turning back to the decision block at 282, if a mapping already exists in the LPMAP (e.g., logical block 1000 has already been mapped), then a comparison is made between the current sequence number of the region to the previously mapped block's region's sequence number (284). A check is then made to determine if the sequence number of the current region was newer than the sequence number referenced by the physical block in the LPMAP. If the sequence number of the current region is not newer than the sequence number referenced by the physical block in the LPMAP, then a stale copy of the data has been discovered and the system moves to the next physical block mappings at 304. If, however, the current region sequence number is newer than the old entry, then the older entry is marked as free by updating the FREEPHYS map to free the block containing a stale pointer. The physical to logical map is also updated (292). Thereafter, the routine branches to add the mapping to the LPMAP and the PLMAP as indicated at blocks 286 and 288 and appropriately mark the newly processed physical block as active.

Figure 7:
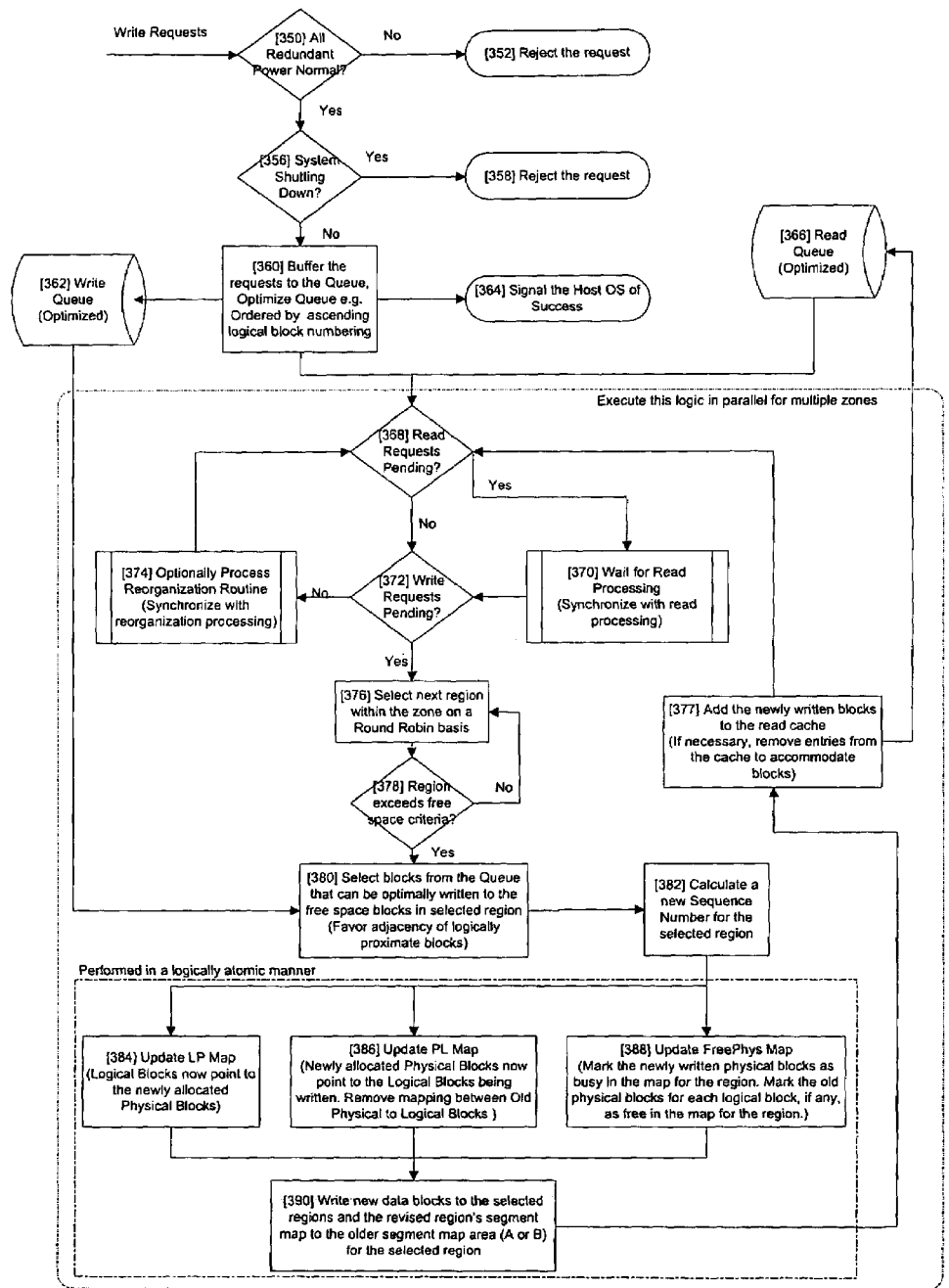
FIG. 7 is a flowchart delineating the sequence of operations involved in update processing.

FIG. 7 is a flowchart delineating the sequence of operations involved in update/write processing. The primary input for update processing is the receipt of write requests. Initially, tests are conducted to determine whether the system is operational. A check is first made to determine whether all the power in the system is functional (350). If all power is not functional, then the request is rejected (352). If all power is functional, a check is made to determine whether the system is in the process of shutting down (356). If the system is shutting down, then the write request is rejected (358).

If the system is not shutting down, then the write request is buffered in the write queue (360). In accordance with an exemplary embodiment of the present invention, the write queue (362) is optimized in accordance with any of a variety of optimization methodologies. In the illustrative embodiment, the optimization occurs by ordering the write queue in ascending logical block numbering (360). For example, if there are write requests to logical blocks 1, 5, 10 and 15, the requests would be accessible from the write queue in this ascending logical block order. Blocks which are written are appropriately stored in cache memory. After the optimization processing occurs at 360, the host operating system receives an indication of the successful completion of the operation (364). In the exemplary embodiment, it is presumed that all logic is executed on in a power-trusted environment, such that sufficient power is present to complete all pending operations prior to ultimate loss of power. The test for power status (350) insures that no request is accepted if power status is insufficient to assure persistent completion. Alternatively, with some minor modification, power need only be sufficient to maintain the queued writes and related information in memory for processing as part of a subsequent restart In an illustrative embodiment, after the completion of the block 360 processing or at a desired point during write queue optimization processing, read requests may be processed. The read queue (366) may likewise be optimized and write requests processing continues. The brief alternation between bursts of write operations, optimized to minimize required write time, and bursts of read operations, reduces thrashing that could be caused by interference between the two types of operations and further allows read operations to be optimized to minimize the time required to seek to each relevant area of each affected zone. As the read and write processing is potentially parallel for multiple zones, the read/write alternation occurs on a per-zone basis, such that one zone may be writing while other zones are reading. It should be further noted that reorganization may be invoked when read or write activity falls below specified criteria (such as there being no pending read or write activity) for any particular zone at any given time.

The following write request processing operations take place in parallel across multiple zones. Initially, a check is made at block 368 to determine whether there are any read requests pending. If there are read requests pending, for the zone or zones in question that corresponds to the processing context or thread in which the decision is made, then the routine read request processing operations (370) is enabled using appropriate concurrency control mechanisms or other invocation methods (the actual processing of read requests is described and depicted separately). Pending read requests will queue up while reads, writes and other activity occur. Such read requests are processed in bursts and then an indication of such processing being completed is input to the "write requests pending" decision block 372, so that write processing is appropriately synchronized with the read processing in an alternating fashion on a zone by zone basis.

If the check at block 368 indicates that there is no read request pending, then a check is made as to whether there are any write requests pending (372). If there is no write request pending, then as indicated at block 374 reorganization processing may occur (which is detail described below), followed by a further check at block 368 to determine whether read requests are pending. The reorganization processing at block 374 permits the system to take advantage of the detected idle time. An exemplary embodiment of the actual reorganization process is described below. The specifics of the reorganization and the use of reorganization at all may vary in particular embodiments. Some embodiments may omit the reorganization process entirely, trading an increment of performance or storage overhead for a less complex implementation.

If there are write requests pending as determined at 372, then a selection of the next region within the zone will occur, which in an illustrative embodiment, is on a round robin basis (376). As indicated above, the selection of the next region within the zone occurring in 376 also occurs in parallel for the multiple zones that have been defined. A zone has separate physical characteristics from other zones so no performance penalty arises as to writing to multiple zones at the same time or at the same time other zones are being read. Write and read processing in parallel across multiple zones leads to significant performance enhancement. Zones denote, for example, multiple independently accessible media, such that access to one does not significantly impact performance or access time to others. The particular organization of the managed space into zones is part of the exemplary embodiment, but is not essential to all embodiments, as a large RAID array, or similar mechanism, or other methods of scheduling, could be used with an alternative embodiment to accomplish the results with similar gains in performance.

After the region has been selected at block 376, a check is then made to determine whether the region exceeds the free space criteria (378). If, for example, the number of free blocks in the region exceeds the average overall number of free blocks, then consideration is given to writing data into that region.

If the region does not exceed the free space criteria, then the region is skipped until the region does exceed the free space criteria. If, for example, the region was empty, then the system will be able to write into every block, thereby enabling writes to occur at an optimally fast drive speed, presuming the optimization for the particular drive favors sequential organization, which is the most likely scenario. Alternatively, if the region is half full, then the maximum write speed under such circumstances is approximate one-half the maximum sequential write speed of the drive. Thus, regions which are nearly full will not be updated based on the free space criteria chosen in a given implementation.

If the region exceeds the free space criteria as determined at block 378, then the system has in effect determined that there is a sufficient number of free blocks for sufficiently optimally writing. The routine then selects blocks from the queue that can be optimally written to the free space blocks in the selected region. Writing is performed such that logical blocks are kept in ascending order and an effort is made to keep logical blocks that were adjacent, adjacent in physical storage (380).

After selecting a region and blocks from the write queue to write into that region, a new sequence number is determined for the selected region (382). The sequence number is essentially a compact time stamp which may be necessary in a recovery scenario to determine which region contains the most recent information for any given logical block.

The processing in blocks 384, 386, 388 and 390 should be performed in a logically atomic manner in accordance with concurrent processing rules. For example, semaphores may be used to protect concurrent access. Thus, as indicated at 384, 386 and 388, all the update processing that occurs, occurs in parallel. Thus, each of the three related data structures, i.e., LPMAP, PLMAP and FREEPHYS map are updated in parallel in 384, 386 and 388, respectively. The FREEPHYS map is updated for each block that is being written (388). Thus, the newly written physical blocks will be marked as busy in the map for the region. The old physical block for each logical block, if any, will be marked as free in FREEPHYS map and PLMAP. Clearly, the physical region containing the previous version of data will still have a map entry, however, that region's sequence number will be lower than the newly written region, ensuring that the obsolete data will be ignored on subsequent recovery. Eventually, the region containing the obsolete data will become the target of an update and its map information will be persistently updated at that time.

The physical block to logical block map is updated (386) such that newly allocated physical blocks now point to the logical blocks being written. The mapping is removed between the old physical to logical blocks. Thus, for each block that is receiving new data, the physical to logical map will receive an entry which identifies the new logical data that it will contain (386). Additionally, the logical to physical map is updated (384), so that all of the newly written logical blocks will point to the newly allocated physical blocks (384).

As indicated at block 390, all the data is then written to the new blocks to the selected regions and the revised region's segment map to the older segment map area (A or B) for the selected region. The routine then branches back to 368 to determine whether any read requests are pending after adding the newly written blocks to the read cache and if necessary, removing entries from the cache to accommodate blocks (377). The actual determination as to whether newly written blocks are retained in cache could be the subject of further optimization. In an illustrative embodiment, newly written blocks are always written to cache, though they may be added such that retention preference is given to recently read data, such as by placing written data at the "middle" of an LRU chain, rather than the most recent end.

By virtue of this processing, a region has been uncovered which is relatively sparsely populated with data, optimized writes were obtained from the write queue and such writes were written to the region. Mapping information regarding the region is thereafter updated and the data in memory is updated, i.e., the LP, PL and FREEPHYS map data structures, so that if attempts are made to read a block, when access is made to the logical to physical array, it can be readily determined where to access the required data.

It should be understood that although in an exemplary embodiment, the physical to logical map, for example, is stored in memory, such storage is not necessary for particular implementations.

Figure 8:
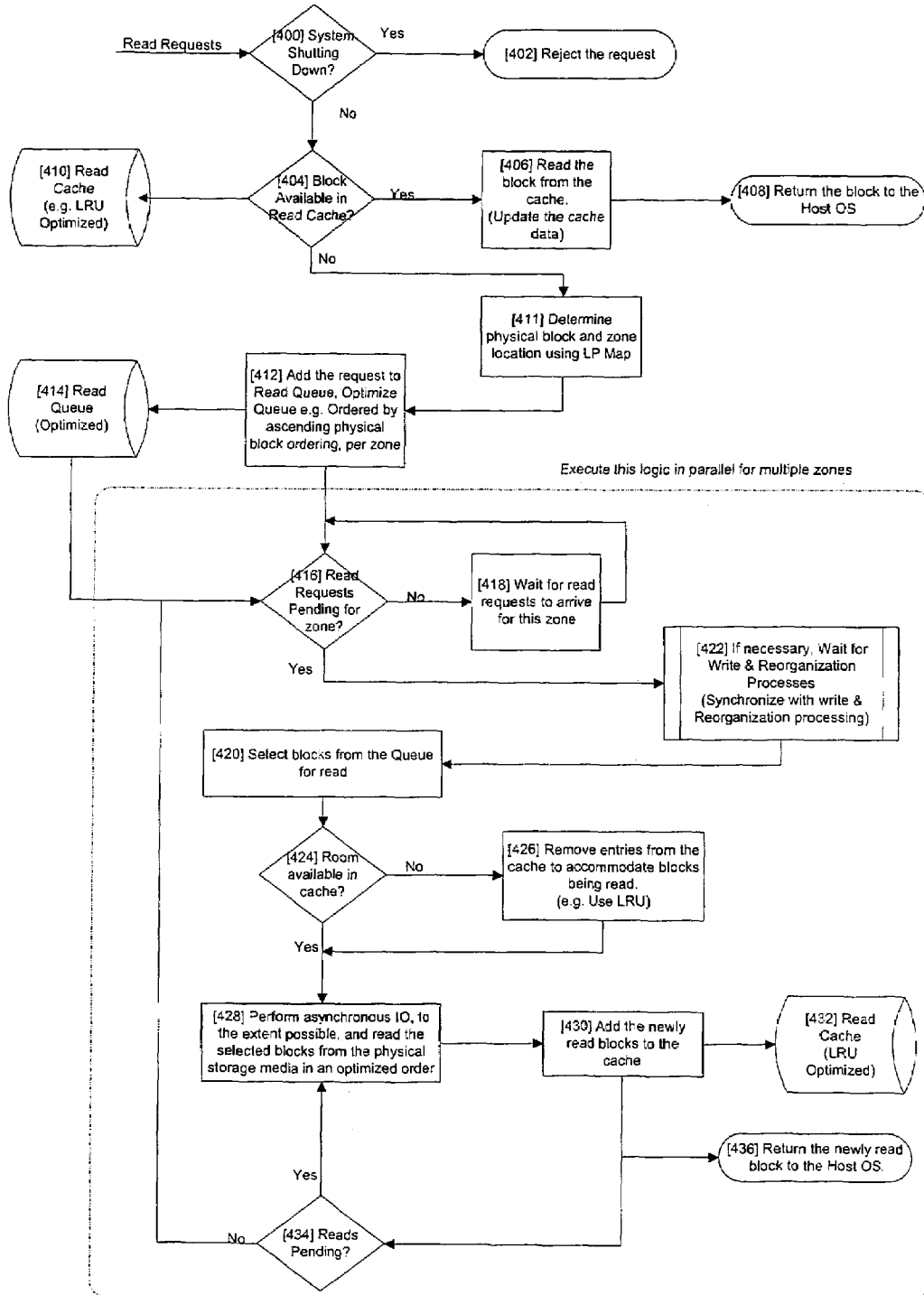
FIG. 8 is a flowchart delineating the sequence of operations involved in read processing in accordance with an exemplary embodiment.

FIG. 8 is a flowchart delineating the sequence of operations involved in read processing in accordance with an exemplary embodiment. As shown in FIG. 8, upon receiving a read request a check is made to determine whether the system is shutting down (400). If the system is in the process of shutting down, the request is rejected (402). If the system is not shutting down, a check is made to determine whether the block is available in read cache (404).

The "read cache" contains recently read or written blocks that are considered likely targets of future read requests. In general, write request are added to the "read cache," unless caching algorithms determine that such writes are not likely targets for reads in the near future (410). The read cache may be managed using any of available known techniques. The cache may be optimized, for example, utilizing a least recently used methodology. If the block was available in read cache, as indicated by the check at 404, then the block is copied from the cache, and the cache data is updated (406) to reflect that the entry was used and affect its criteria for removal from the cache at later times. The block is then returned to the host operating system (408).

If the check at block 404 indicates that the block is not available in the read cache, then the physical block and zone location is determined using the LP map (411). The request is then added to the read queue, which is optimized, for example, by being ordered by ascending physical block per zone. The request is then added to the read queue (414).

The read processing which follows is executed in parallel for multiple zones. The read queue indicates from which zone the data must be obtained together with the physical location of the data. A check is initially made, as indicated above, for each zone, as to whether there is a read request pending for the zone (416). If there is no read request that is stored for the particular zone, then the system waits for read request to arrive for this zone (418) and branches back to 416.

If there is a request that is pending for the zone, then as indicated at 422, the system waits, if necessary, for write and reorganization processes which are on-going, before starting to process the read requests. The system operates to synchronize the read requests with the write and reorganization processing. This synchronization limits "thrashing" by alternating between brief bursts of write activity, involving optimized updates as described earlier, bursts of read, also optimized to minimize retrieval time due to seeking or mechanical access time differences, and reorganization which may occur during idle time or periods of lesser activity.

Thereafter, blocks are selected from the read queue (420). A check is then made at 424 to determine whether there is room available in cache. If the information that is being read is going to be cached, but there is no room available in the cache, then entries are removed from the cache to accommodate the blocks being read (e.g., using a latest recently used algorithm) (426). If there is room available in the cache or after the removal of entries, in accordance with block 426 processing, then the system performs asynchronous I/O operations by issuing the requests that are outstanding in an optimized order to the extent possible and reading the selected blocks from the physical storage medium (428). As the blocks are read, the newly read blocks are added to the cache (430). The read cache (432) is then updated and least recently used optimized (or other technique with the objective of predicting which cache entries have the most value in terms of reducing future physical accesses). Once the block has been read, the newly read blocks are returned to the host operating system (436). Thus, the blocks are returned to the host operating system on a block at a time basis in accordance with an exemplary embodiment.

A check is then made to determine whether there are more selected reads pending (434). If there are more selected block reads pending, then the routine branches to 428 to perform asynchronous I/O in an optimized order as previously indicated. If there are no reads pending, then the routine branches back to 416 to await more read requests. The actual flow through cache and physical read processing will vary to some extent from one embodiment to another. Further, the actual methods of synchronizing the alternation between read, write and reorganization, and dispatching of activity within each, are the subject of detailed implementation choices in a given embodiment or environment in which it would run. The illustrative embodiment presents the synchronization and dispatch approach in a generally suitable form for a wide variety of environments, though there are many trivial variations thereof.

Figure 9:
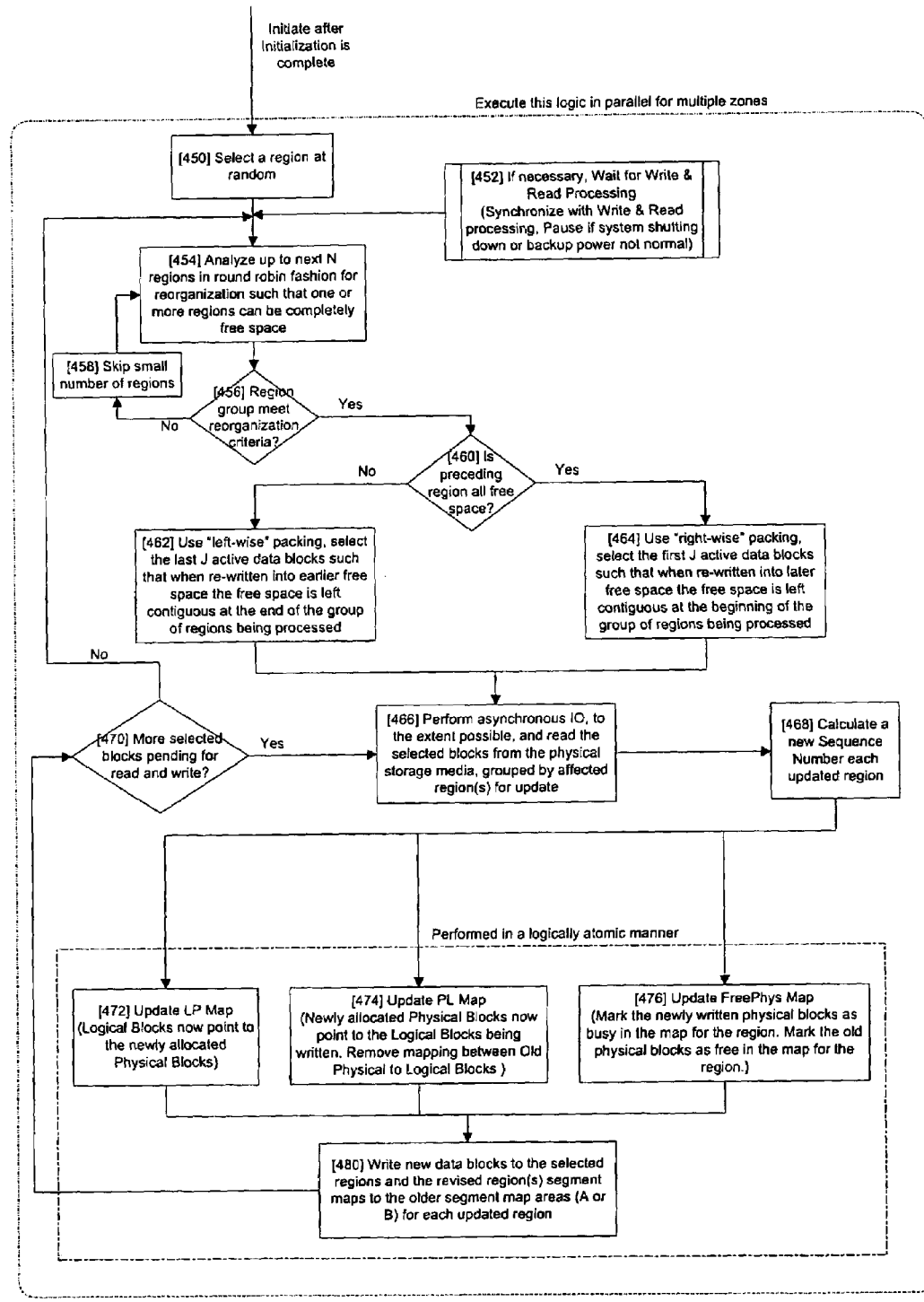
FIG. 9 is a flowchart delineating the sequence of operations involved in reorganization processing in accordance with an exemplary embodiment.

FIG. 9 is a flowchart delineating the sequence of operations involved in reorganization processing in accordance with an exemplary embodiment. As a result of the processing that has occurred in as described above, over time each region would have an average space density. Thus, if the array was half full, over time all the regions would be half full, on average. In order to further optimize the processing, the various regions are then packed to ensure that free space in each region is packed together and that a larger number of regions have a high degree of free space.

The processing which follows is executed in parallel for multiple zones. As indicated at block 450, after initialization is completed, a region is selected at random once per each of the zones. Processing across each zone occurs in parallel. This reorganization processing takes place during idle time.

As indicated at block 452, if necessary, the routine waits for write and read processing to be completed. Reorganization processing and is synchronized with read and write processing and is paused if the system is shutting down or back up power is not normal.

As indicated at 454, in an exemplary embodiment, the routine analyzes up to the next N regions in a round robin fashion for reorganization such that the sum of free space in the examined regions would leave one or more regions with completely free space. Thus, for example, after a set of regions are selected, e.g., 5 regions, the routine determines that if the free space is packed, the fifth region will be completely free.

A check is then made at 456 to determine whether the group of regions selected meet the reorganization criteria. If the reorganization criteria is not met, then a small number of regions are skipped to determine whether further regions will meet the criteria (458). Thus, the system looks for groups of regions which will benefit from this reorganization. If the check at block 456 indicates that the reorganization criteria has been met, then the routine will proceed with the reorganization.

A check is then made at block 460 as to whether the preceding region includes all free space. If the preceding region includes all free space, the system uses "right-wise" packing, selecting the first J active data blocks such that when rewritten into later free space in the group of regions, the total free space in the group of regions is left contiguous at the beginning of the group of regions being processed (464). The right-wise packing operates to move the free space to the beginning and the data to the end of the region. The result, when used following a free region, places sparse regions together to improve later update performance when updates must span regions.

If the preceding region is not all free space, which will likely occur during the first pass through this algorithm, then the routine uses "left-wise" packing to select the last J active data blocks such that when re-written into earlier free space in the group of regions, the total free space in the group of regions is left contiguous at the end of the group of regions being processed (462). In 462, the routine performs packing operations so the free space is at the end of the region. When the routine branches back to 460 for the next group of regions, it is possible that the preceding region had been subjected to packing processing and includes all free space, which would trigger the opposite logic at 464. This approach therefore serves to put free space together at the end of one region and the beginning of another region.

After either the left-wise or right-wise packing operations are performed at 462 and 464, then the system performs asynchronous I/O operations to the extent possible and reads the selected blocks from the physical storage grouped by affected regions for update (466). Thus, all the blocks that are about to be moved are read asynchronously. A new sequence number is then calculated for each updated region (468).

Thereafter, the same logic that occurred during the update processing in FIG. 7 is repeated in the identical update processing logic in FIG. 9. Thus, the update LP map, update PL map, update FREEPHYS map, and the write new data blocks set forth in FIG. 9 blocks 472, 474, 476 and 480 correspond to their FIG. 7 update processing counterpart blocks 384, 386, 388 and 390. Thereafter, the routine branches back to block 470 to check for more selected blocks pending. If the check at block 470 indicates there are not more selected blocks pending for read and write, then the routine branches back to block 454 to analyze up to the next N regions in round robin fashion as previously explained. If the check at block 470 indicates that there are more selected blocks pending, then processing continues at block 466 to perform asynchronous I/O as previously explained.

There are alternative embodiments that further improve operation in some environments by eliminating the need to maintain both a physical to logical and logical to physical mapping information. These embodiments trade some increase in the complexity of the logic for a decrease in the amount of high speed memory needed by the embodiment. Two exemplary approaches to accomplish this follow. These are indicative of approaches that maintain the mapping information more compactly, though actual implementations will consider trade-offs of various computational resources, including persistent storage, high speed memory (RAM), data transfer speeds, and processing speeds, to determine the best combination of data structures and logic to maintain the mapping information.

In one alternative embodiment, as described above, the physical to logical mapping is maintained explicitly both in high speed memory and in persistent physical storage. This approach simplifies implementation, but does so at a cost of considerable increases in use of high speed memory.

As an alternative, the physical to logical map can be omitted, provided that a strategy is used to maintain a persistent logical to physical map and maintain FREEPHYSMAP, which can be derived from either an LPMAP or a PLMAP.

Once such approach is an alternative region organization, where LPMAP information is stored in each region, rather than PLMAP information. This information is needed in two forms, fragments of the absolute LPMAP at the time the region was last updated and incremental information that reflects changes to the LPMAP that result from specific updates mapped to a region during an update. This approach deterministically stores a copy of the LPMAP through a large number, such as 1,000 to 10,000, or other suitable number, of locations throughout the physical space (in what we refer to as regions). Further, each region contains a reserved area assigned for remapping information. The remapping information is added to indicate the L/P pairs written to the region. Once a region's remapping blocks are utilized in whole or in part, no further updates are allowed to the region until the round-robin process has been completed and each other region has been updated or skipped in round-robin fashion.

Each remapping block would accept pairs of logical/physical block mappings, up to the capacity of the storage block. A separate group of blocks, maintaining the overall map fragment, would correspond to consecutive logical blocks and may contain additional control information to validate integrity (e.g., this block contains LPMAP entries for Logical blocks X to X+N, where N is the number of entries that fit in the block—this distribution of LPMAP data throughout the physical space would be mostly stable over time, modified only if necessary to accommodate new zones or some other purpose).

For each of the LPMAP fragments, say 1,000 to 10,000, a flag is retained to indicate whether any LPMAP entries in the fragment have changed since the last write. As the volume allocation is used, in a round robin fashion, the flags are set when remappings occur and cleared when the region corresponding to the LPMAP fragment is later rewritten and the LPMAP fragment has been updated.

In this approach, the set of LPMAP fragments and remapping, of which there may be 1,000 to 10,000 or some other suitable number, can be collectively read and deterministically evaluated to reconstruct the state of the LPMAP in a later recovery process.

A further embodiment, as an additional alternative to the above approach is, is to use a dedicated area, within the managed space or elsewhere, to sequentially, or otherwise efficiently, store the LPMAP on some periodic basis in combination with incremental remapping entries stored in regions proximate to the affected physical data. The LPMAP images would be stored with a compact timestamp or sequence number. It is also recommended, but not essential, that a plurality of versions of LPMAP are stored in a rotation scheme and then the best current copy is selected based on a combination of checksum and timestamp during later recovery and initialization. In this embodiment, the incremental remapping information would also be stored with a compact timestamp, and also possibly rotating versions in a similar manner. The timestamp associated with each region would also be retained in high speed memory to determine when a region is eligible for further updates.

In basic operation, updates occur to a region and are accompanied with writes of LP remapping blocks, similar in function to the previous embodiment, combines a compact timestamp or serial number and a series of entries indicating the logical to physical mapping pair for each updated block in the region. The region will remain locked, once updated, until the LPMAP is later persistently saved with a sequence number or timestamp which is more recent than the region's update value.

Although the "locking" approach is illustrative and simple, it is desirable to track slightly more information on the state of regions and retain the option to update a region multiple times between persistent updates of the LPMAP. For example, if a plurality of blocks were available for LP remapping purposes in each region, the region control information in high speed memory could retain a plurality of sequence numbers (or other compact timestamps), each with indications of which blocks of the region's remapping information were used in the update operation that corresponds to the particular sequence number. As the LPMAP is persistently stored each time, or at some other effective frequency or convenient time, the context for each region is checked and remapping entries with older sequence numbers are marked as available for future use when the region is updated.

This approach allows the bulk of the LPMAP storage operations to occur to out-of-band devices that do not compete heavily with the primary storage zones for resources. These could be dedicated storage devices, or dedicated physical storage that are not included in the managed space, or allocated within the managed physical space itself. Further, specialize hardware, such as battery backed up RAM devices, flash cards, or other approaches could be used to efficiently store the LPMAP. The approach assumes that the LPMAP is persistently stored frequently enough to ensure that sufficient regions exist with available remapping space to accommodate updates.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for improving the write performance of non-uniform access storage having a plurality of units of physical storage, each unit including a plurality of regions, said method comprising the steps of:

maintaining mapping information for said plurality of units of physical storage, providing the association of logical blocks with physical blocks and providing an indication as to whether a physical block contained in the physical storage is allocated for use;

receiving a plurality of write requests;

assigning said plurality of write requests to unallocated physical storage in substantially sequential storage locations;

writing data in response to said plurality of write requests into assigned grouping of substantially contiguous logical storage blocks;

enabling subsequent reuse of any previously allocated physical storage associated with said plurality of write requests; and repeating said steps of assigning, writing and enabling for at least a further plurality of write requests;

wherein the step of assigning includes the steps of selecting a region and determining whether the region exceeds a predetermined free space criteria computed based on the overall number of free blocks for all regions.

2. A method in accordance with claim 1, further including the step of indicating in a memory map all physical storage associated with updated logical data as unallocated for use in subsequent operations.

3. A method in accordance with claim 1, wherein the step of assigning includes the step of assigning the plurality of write requests to sequential storage locations.

4. A method in accordance with claim 1, wherein the step of assigning includes the step of assigning the plurality of write requests to storage locations which are in close proximity in physical storage.

5. A method in accordance with claim 1, wherein the step of assigning includes the step of assigning the plurality of write requests to minimize total write time and approach maximum write performance.

6. A method for improving the write performance of non-uniform access storage having at least one unit of physical storage, said method comprising the steps of:

maintaining mapping information for said at least one unit of physical storage, providing the association of logical blocks with physical blocks and providing an indication as to whether a physical block contained in the physical storage is allocated for use;

receiving a plurality of write requests;

assigning said plurality of write requests to unallocated physical storage in substantially sequential storage locations;

writing data in response to said plurality of write requests into assigned grouping of substantially contiguous logical storage blocks;

enabling subsequent reuse of any previously allocated physical storage associated with said plurality of write requests; and repeating said steps of assigning, writing and enabling for at least a further plurality of write requests;

wherein said at least one unit includes a plurality of units and each unit includes a plurality of regions and wherein the step of assigning includes the steps of selecting a region and determining whether the region exceeds a predetermined free space criteria; and wherein each region includes a plurality of blocks and wherein the determining step includes the step of determining whether the number of free blocks in the selected region exceeds the overall average number of free blocks for all regions.

7. A method for improving the write performance of non-uniform access storage having a plurality of zones of physical storage, each of said zones being a separately and independently accessible portion of storage space, comprising the steps of:

maintaining mapping information in a memory device for each of said plurality of zones of physical storage, providing the association of logical blocks with physical blocks and providing an indication as to whether a physical block contained in the physical storage is allocated for use;

receiving a plurality of write requests;

buffering said write requests in a write queue;

assigning write requests from said write queue to each of said plurality of zones in parallel, said step of assigning including the step of assigning unallocated physical storage in substantially sequential storage locations in each of said plurality of zones;

writing data in response to said plurality of write requests into assigned substantially contiguous logical storage blocks in said plurality of zones; and enabling subsequent reuse of any previously allocated physical storage associated with said plurality of write requests;

wherein each zone includes a plurality of regions and wherein the step of assigning includes the steps of selecting a region and determining whether the region exceeds a free space criteria computed based on the overall number of free blocks for all regions.

8. A method in accordance with claim 7, wherein each zone includes a plurality of regions and further including the step of packing said plurality of regions to pack together the free space in each region.

9. A method for improving the write performance of non-uniform access storage having a plurality of zones of physical storage, each of said zones being a separately and independently accessible portion of storage space, comprising the steps of:

maintaining mapping information in a memory device for each of said plurality of zones of physical storage, providing the association of logical blocks with physical blocks and providing an indication as to whether a physical block contained in the physical storage is allocated for use;

receiving a plurality of write requests;

buffering said write requests in a write queue;

assigning write requests from said write queue to each of said plurality of zones in parallel, said step of assigning including the step of assigning unallocated physical storage in substantially sequential storage locations in each of said plurality of zones;

writing data in response to said plurality of write requests into assigned substantially contiguous logical storage blocks in said plurality of zones; and enabling subsequent reuse of any previously allocated physical storage associated with said plurality of write requests;

wherein each zone includes a plurality of regions and wherein the step of assigning includes the steps of selecting a region and determining whether the region exceeds a free space criteria; and the determining step includes the step of determining whether the number of free blocks in the selected region exceeds the overall average number of free blocks of all regions.

10. A method for improving the write performance of non-uniform access physical storage, said physical storage including a plurality of zones, each zone including a plurality of blocks, said method comprising the steps of:
   mapping said plurality of blocks into logical storage;
   maintaining a map of the correspondence between physical locations and logical locations in a memory device;
   receiving a plurality of write requests to write data to locations in each of a plurality of said zones;
   determining whether any write requests are pending;
   dynamically remapping said logical storage in parallel for a plurality of zones in response to said plurality of write requests; and
   writing data in response to said plurality of write requests into successive blocks in parallel for a plurality of zones;
   wherein each zone includes a plurality of regions and wherein the step of dynamically remapping includes the steps of selecting a region and determining whether the region exceeds a predetermined free space criteria computed using the overall number of free blocks for all regions.

11. A method according to claim 10, where said step of dynamically remapping includes the step of identifying the logical space for the next plurality of write requests based on the density of free space therein.

12. A method according to claim 10, wherein the dynamically remapping step includes the step of changing the mapping of where data is stored in order to optimize the data storage performance.

13. A method in accordance with claim 10, wherein said step of maintaining a map includes the step of identifying all physical storage associated with the updated logical data as unallocated for use in subsequent operations.

14. A method in accordance with claim 10, wherein each zone includes a plurality of regions and wherein the step of dynamically remapping includes the step of selecting a region in each of said plurality of zones for writing data which has a sufficient amount of free storage space for said plurality of write requests.

15. A method in accordance with claim 10, wherein each zone includes a plurality of regions and further including the step of reorganizing said regions such that a set of regions is selected where the number of regions in the set is determined by whether the set meets a predetermined reorganization criteria relating to free space.

16. A method in accordance with claim 10, wherein each zone includes a plurality of regions and further including the step of reorganizing said regions such that free space is placed together at the end of one region and the beginning of another region.

17. A method for improving the write performance of non-uniform access physical storage, said physical storage including a plurality of zones, each zone including a plurality of blocks, said method comprising the steps of:
   mapping said plurality of blocks into logical storage;
   maintaining a map of the correspondence between physical locations and logical locations in a memory device;
   receiving a plurality of write requests to write data to locations in each of a plurality of said zones;
   determining whether any write requests are pending;
   dynamically remapping said logical storage in parallel for a plurality of zones in response to said plurality of write requests; and
   writing data in response to said plurality of write requests into successive blocks in parallel for a plurality of zones;
   wherein each zone includes a plurality of regions and wherein the step of dynamically remapping includes the steps of selecting a region and determining whether the region exceeds a predetermined free space criteria; and
   each region includes a plurality of blocks and wherein the determining step includes the step of determining whether the number of free blocks in the selected region exceeds the overall average number of free blocks for all regions.

* * * * *